April 2, 1957　　　S. HANSEN　　　2,787,416
ELECTRICAL CALCULATING MACHINES
Filed Oct. 23, 1951　　　　　　　　　　16 Sheets-Sheet 1
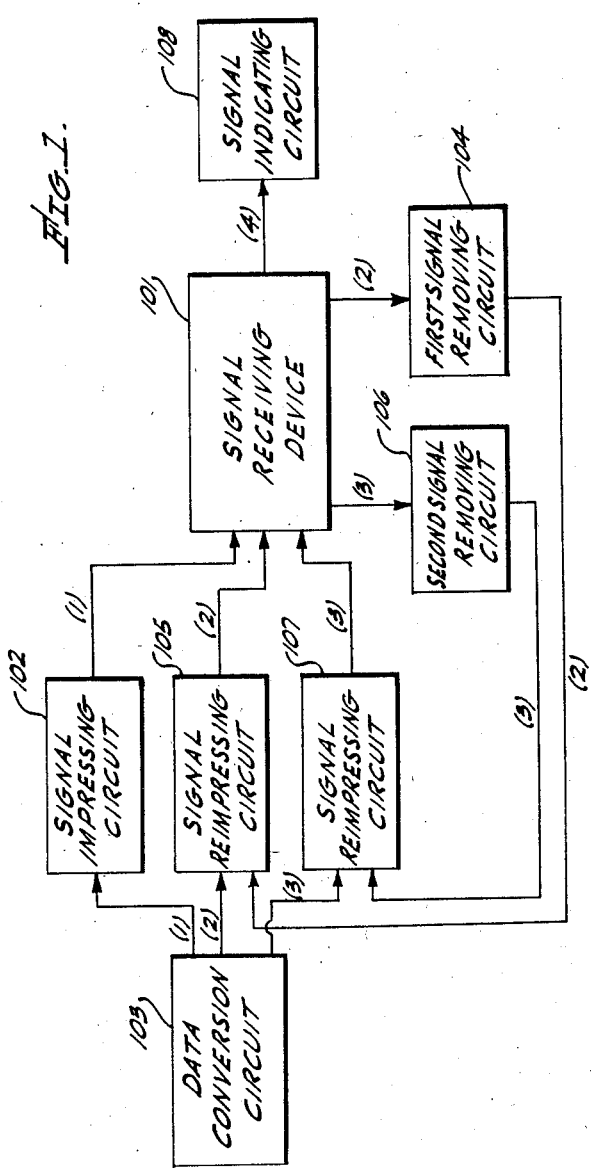
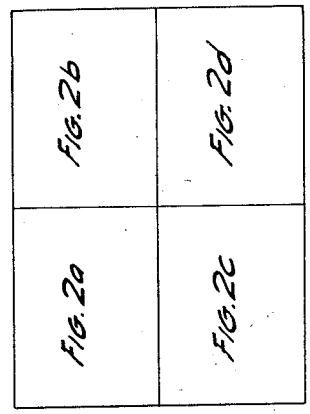
INVENTOR.
SIEGFRIED HANSEN,
BY
Seymour M. Rosenberg
ATTORNEY.

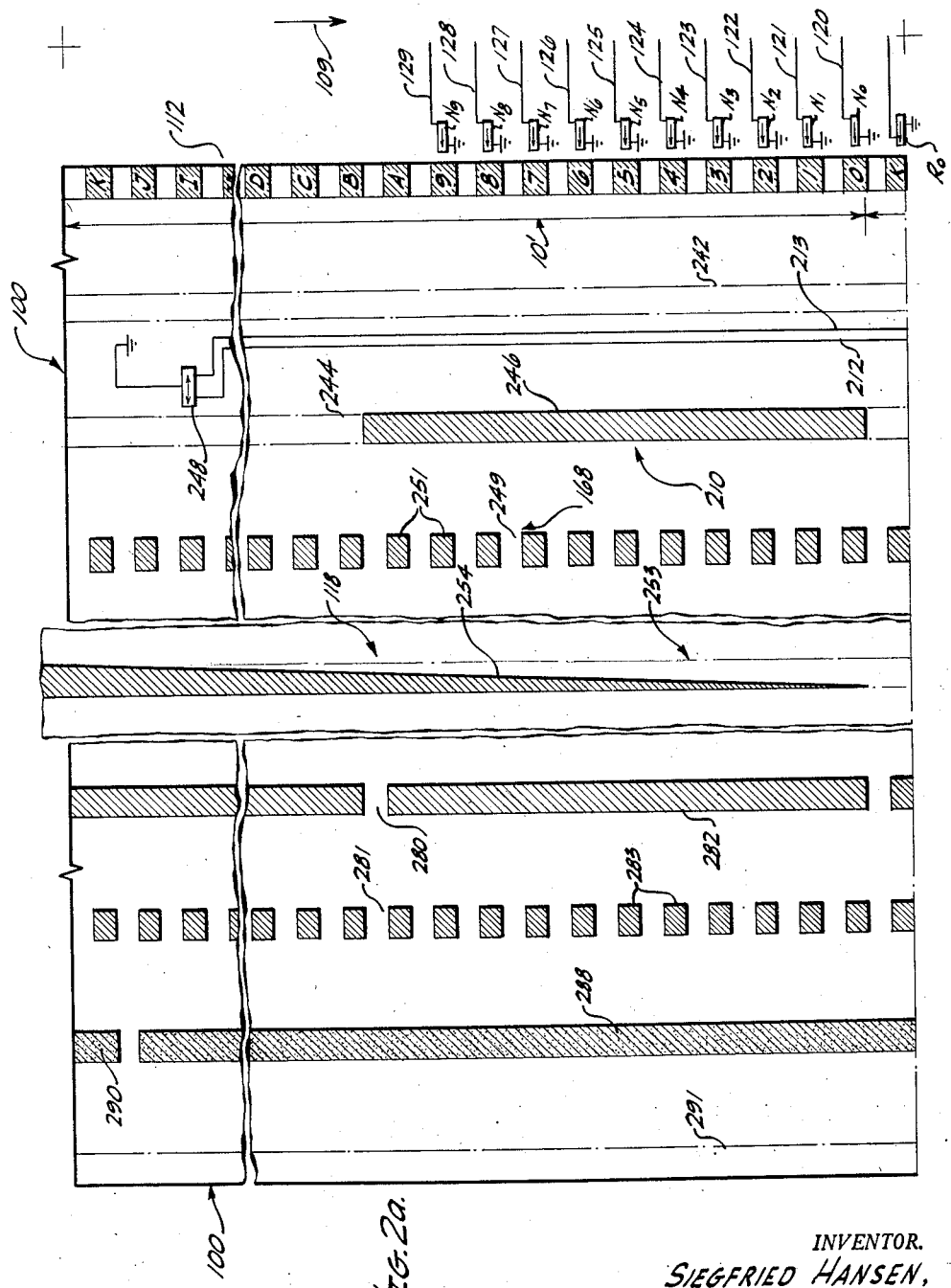

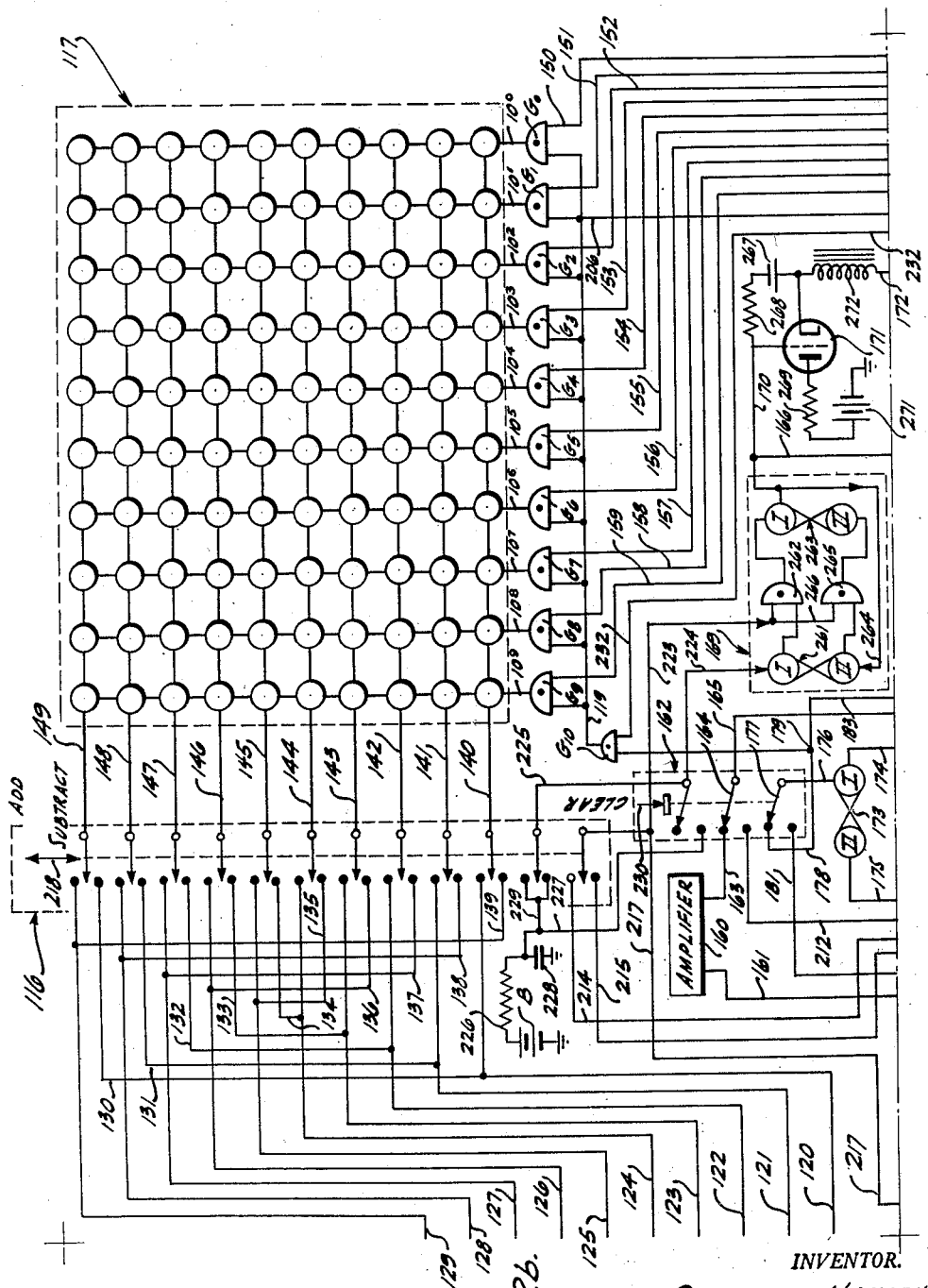

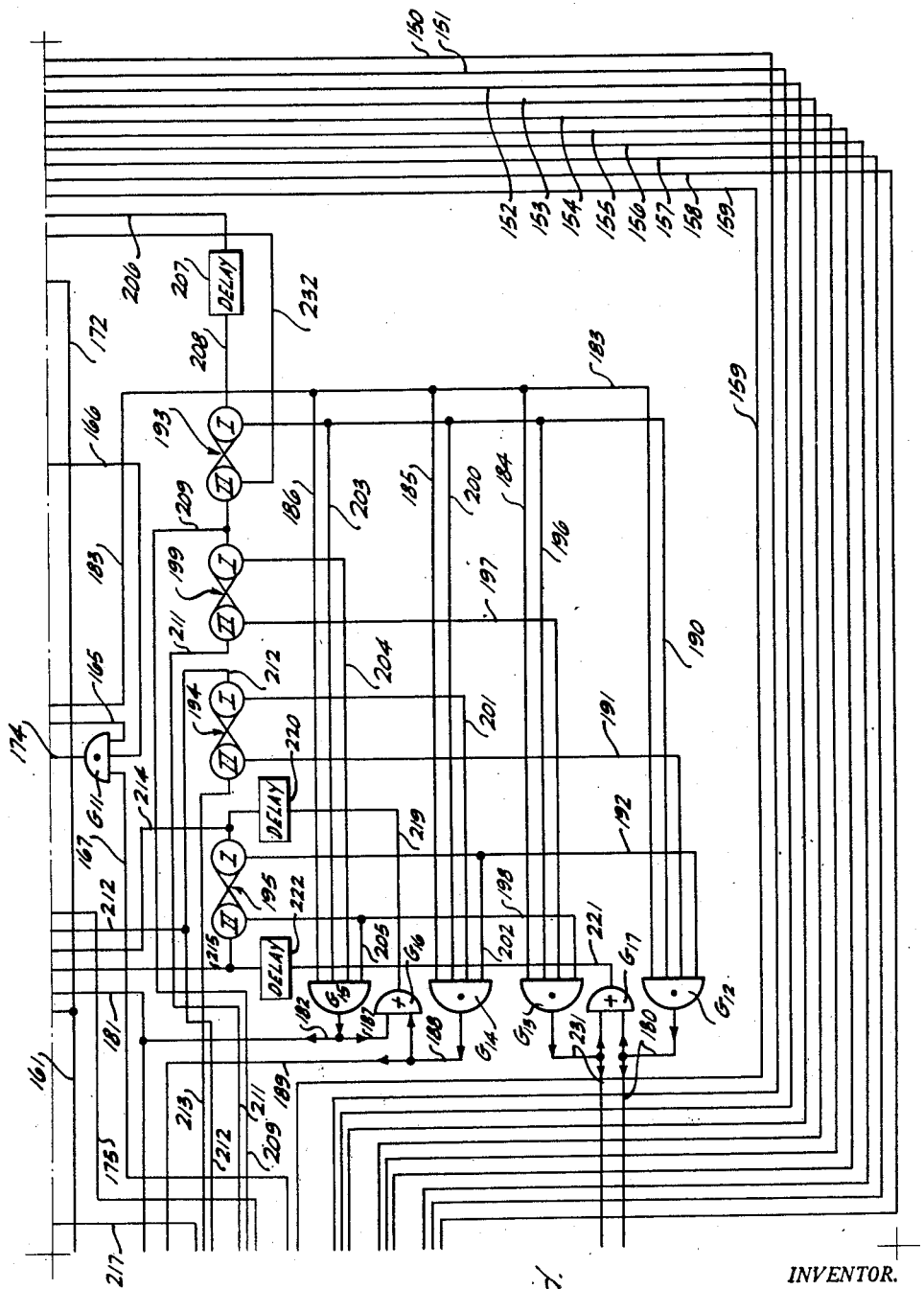

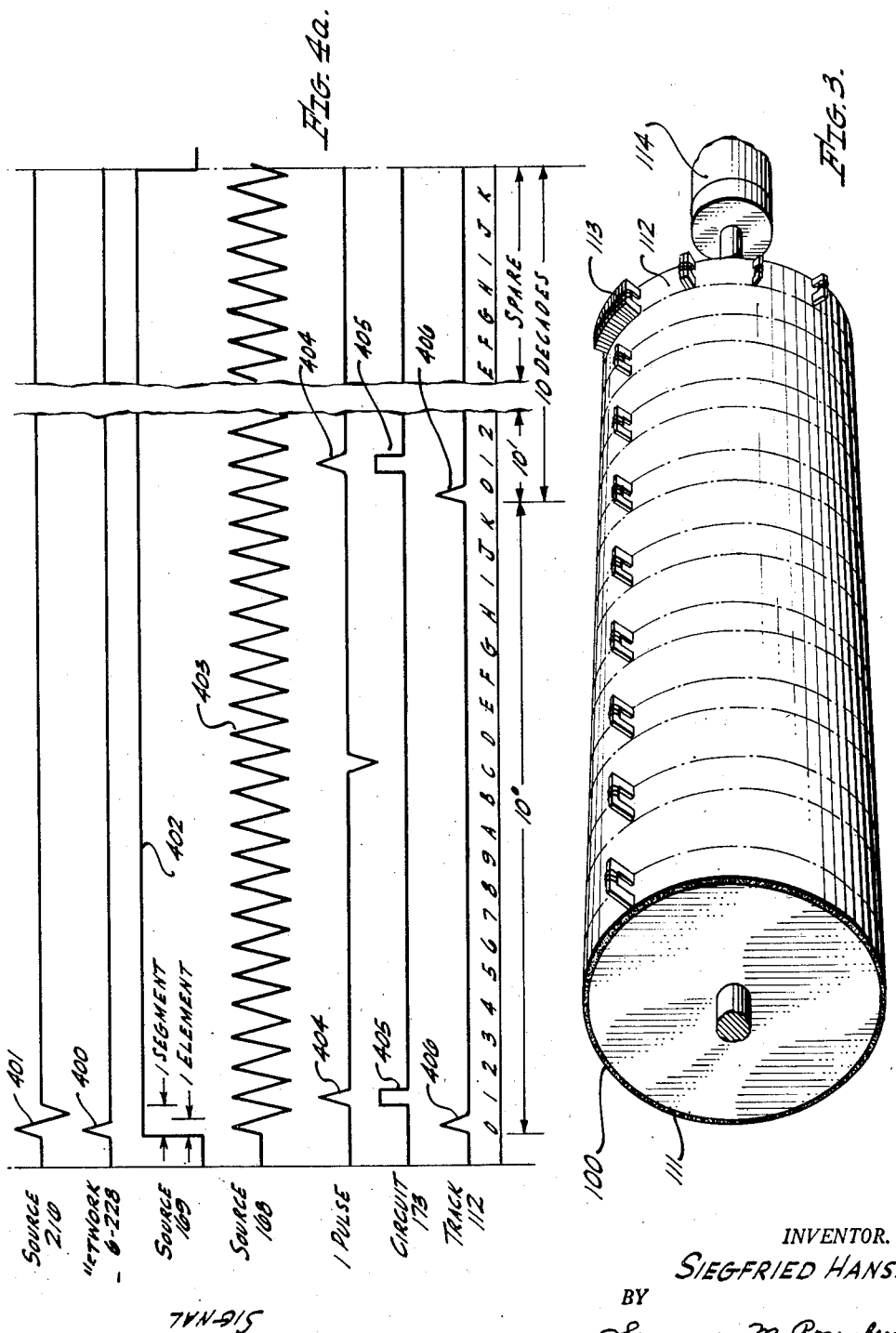

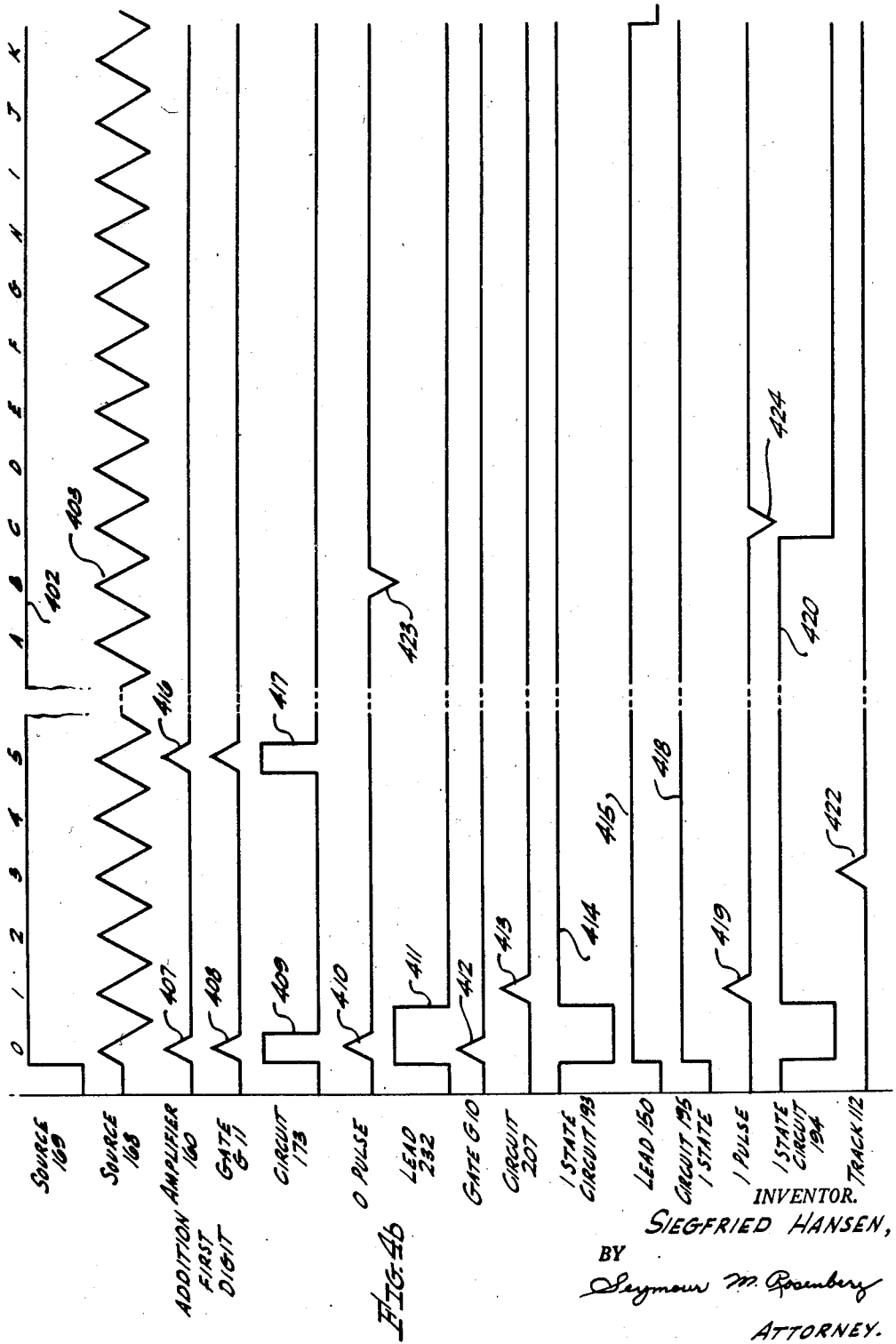

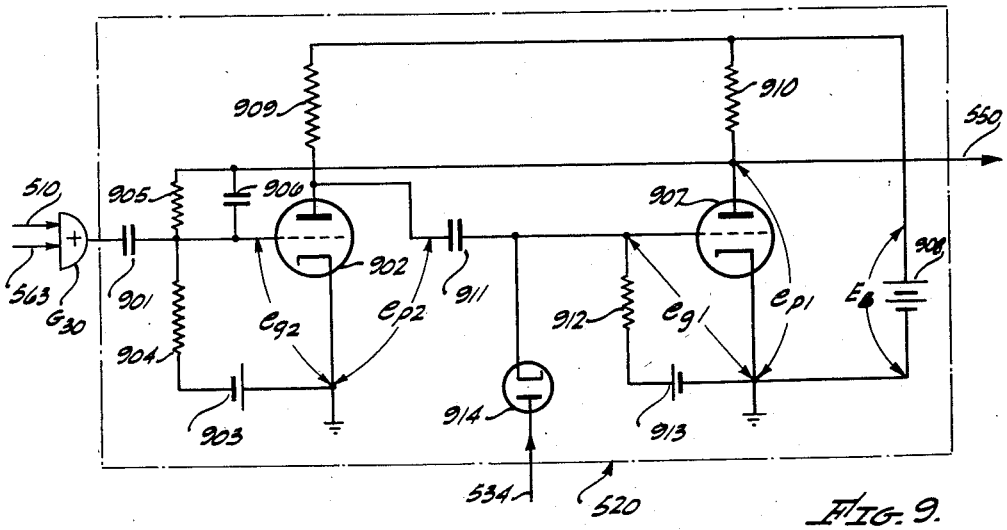
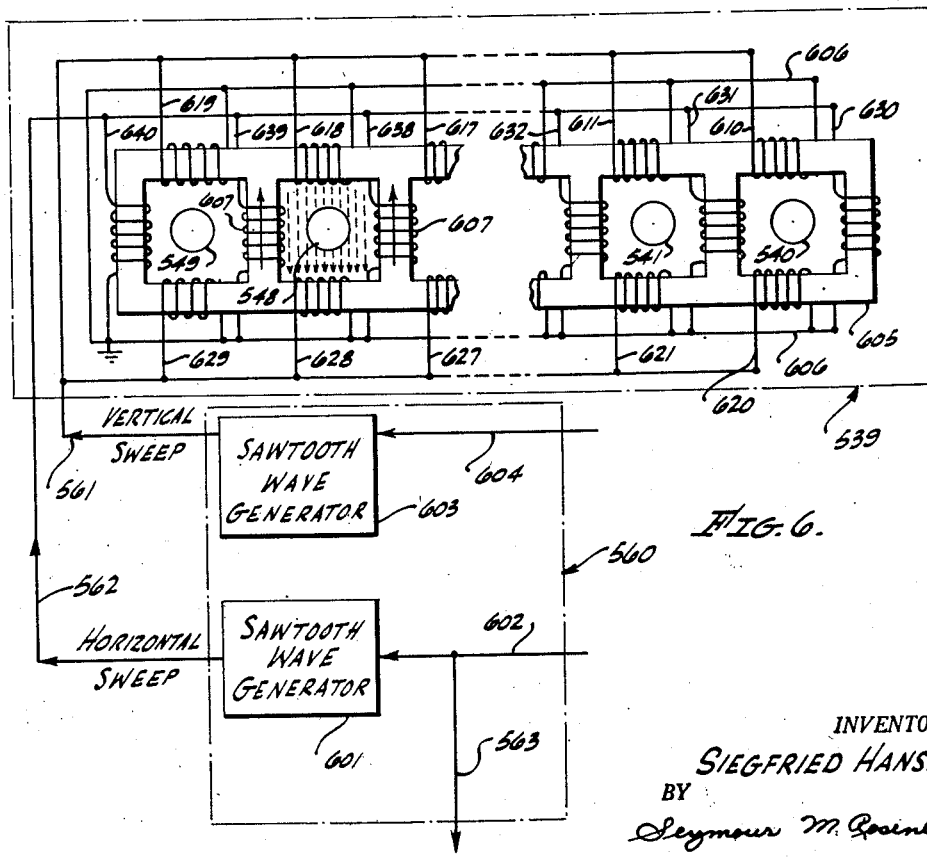

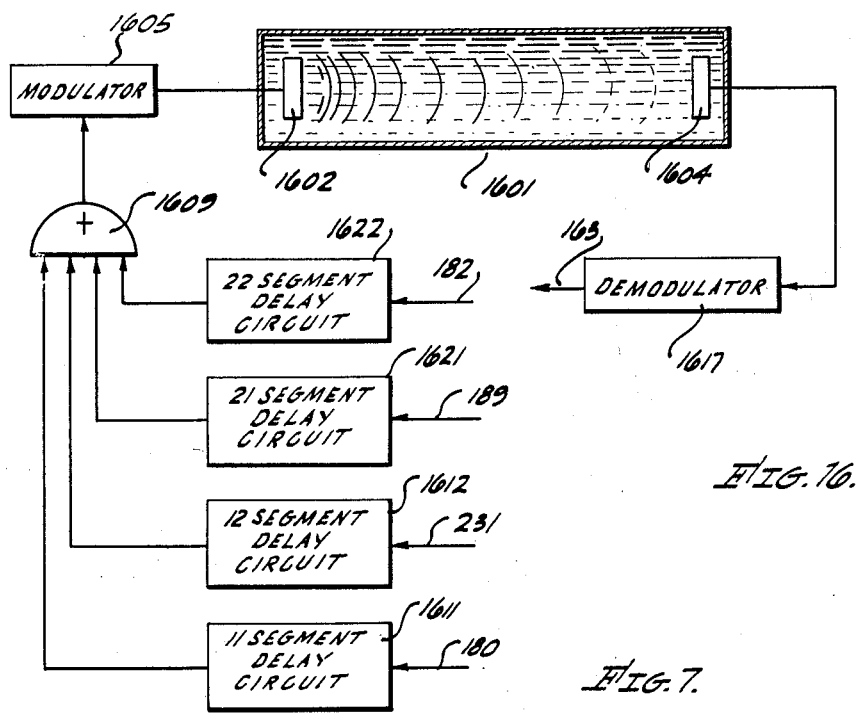
FIG. 16.
FIG. 7.
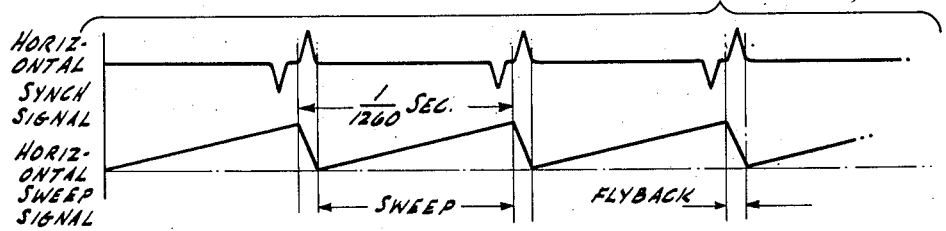
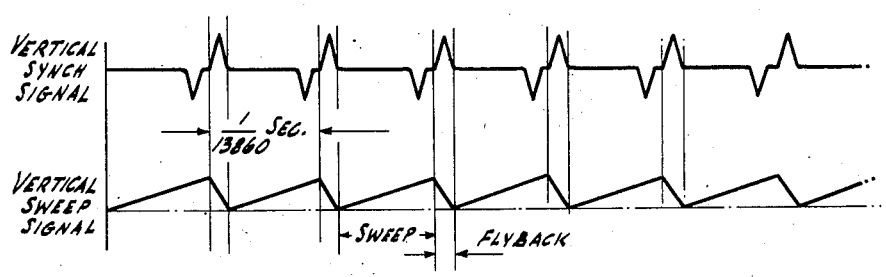
SCREEN PATTERN
INVENTOR.
SIEGFRIED HANSEN,
BY
Seymour M. Rosenberg
ATTORNEY.

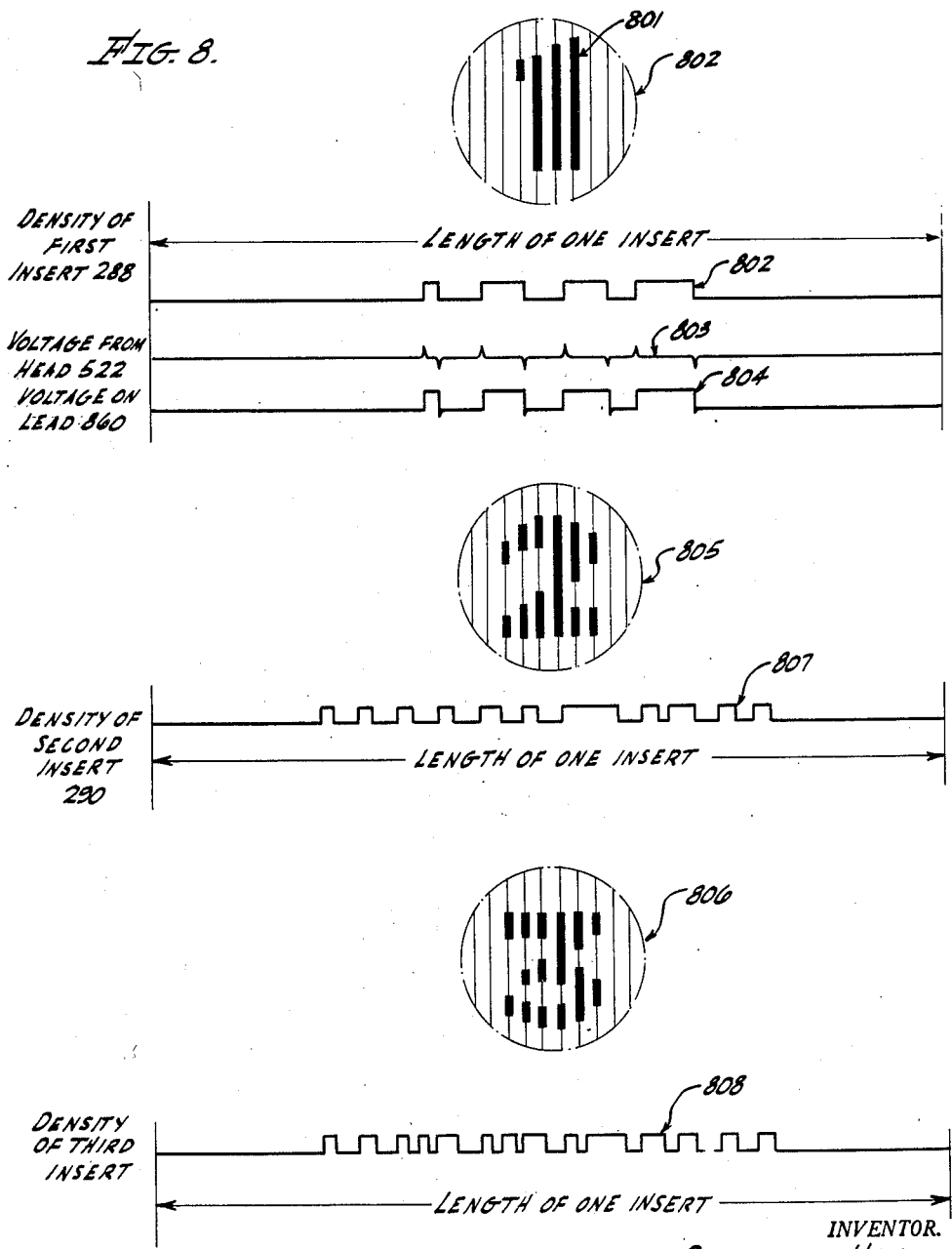

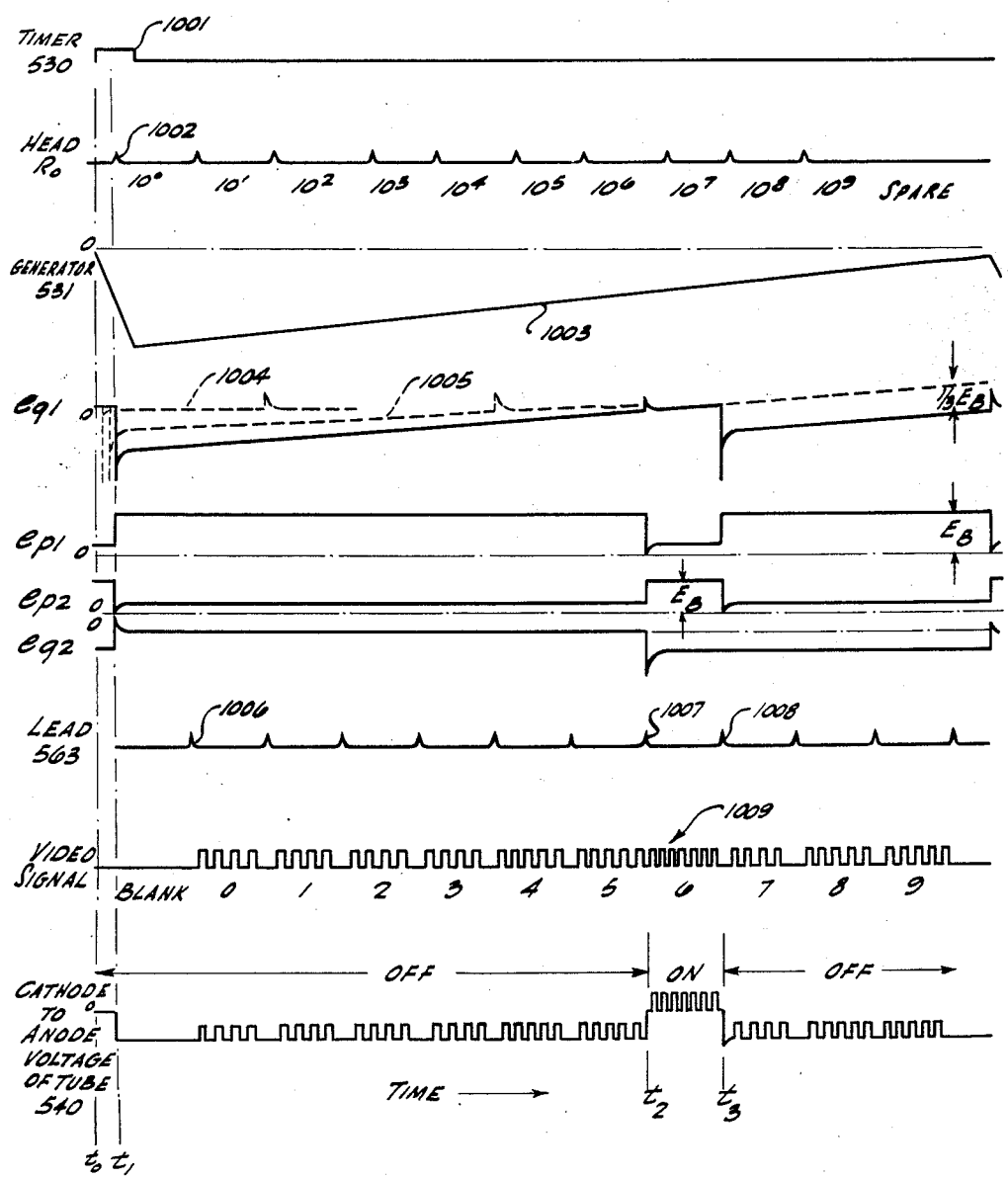

INVENTOR.
SIEGFRIED HANSEN,
BY
ATTORNEY.

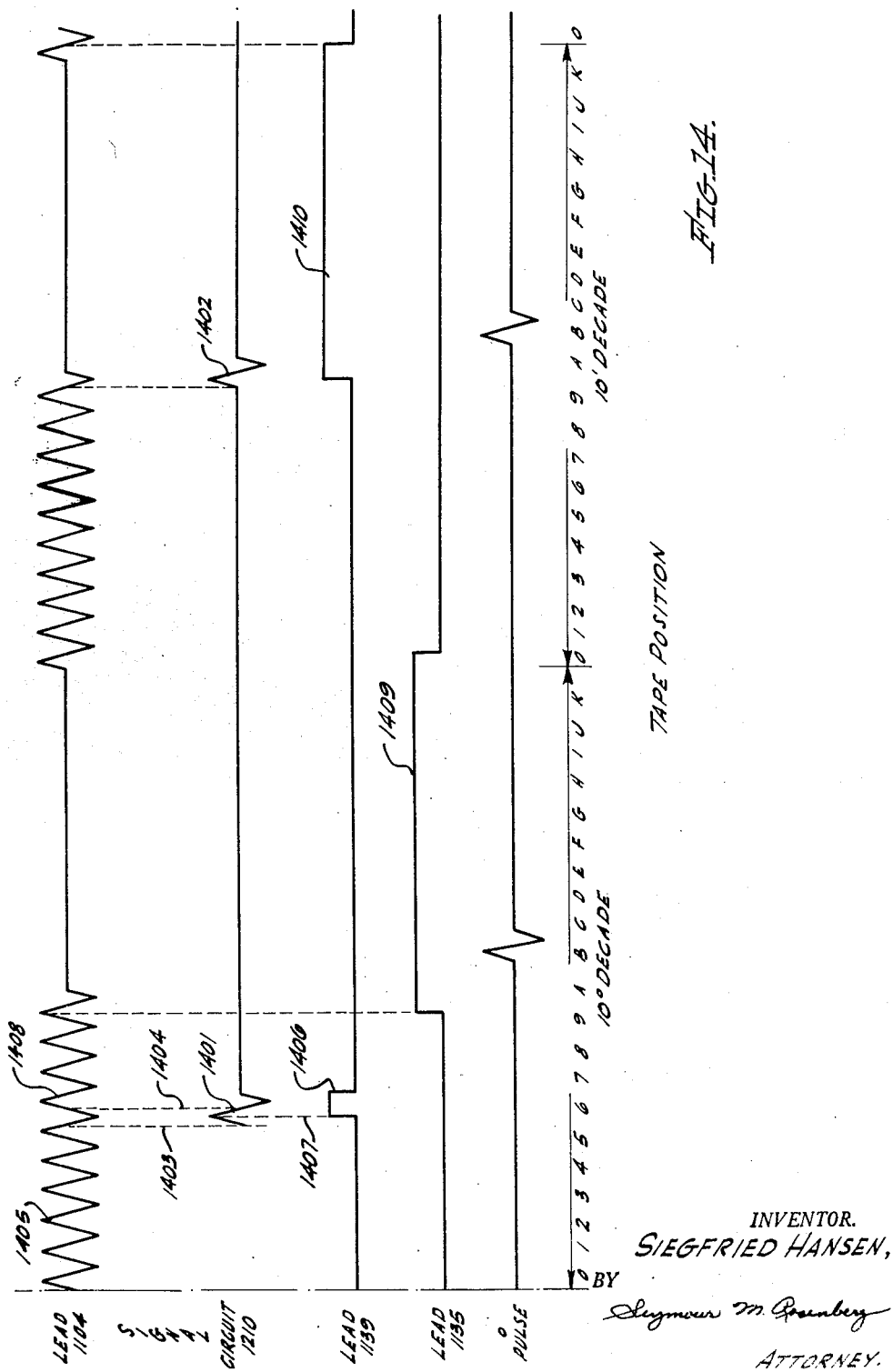

INVENTOR.
BY SIEGFRIED HANSEN,
ATTORNEY.

United States Patent Office

2,787,416
Patented Apr. 2, 1957

2,787,416

ELECTRICAL CALCULATING MACHINES

Siegfried Hansen, Los Angeles, Calif., assignor, by mesne assignments, to Hughes Aircraft Company, a corporation of Delaware Application October 23, 1951, Serial No. 252,622

1 Claim. (Cl. 235—61)

This invention relates to electrical calculating machines and more particularly to electrical calculating machines for performing adding and subtracting operations.

Prior art electrical calculating machines generally have operated with a binary cell as the basic element. Thus, one group of electrical calculating machines represents each of the digits of the original number in a given code configuration, and performs arithmetic operations according to rules which account for the relationship between the code and digital arithmetic. Examples of this group are binary-coded decimal machines which convert each decimal digit into a code configuration, such as a four-place binary number, and operate individually on each place of the binary number by means of a binary cell, such as a flip-flop circuit.

Another group of electrical decimal calculating machines employs a ring counter including ten binary cells, only one of which is in number-indicating position at any given instant. The signal representing the decimal digit is in the form of a burst of pulses which actuate the ring counter to render the appropriate cell operative. In machines of this group, ten binary cells are required for each place of the decimal number, and means must be provided for indicating which of the ten cells is in number-indicating system.

It is clear that in each of the groups of prior art electrical calculating machines, a large number of binary cells are required to perform even a relatively simple mathematical operation of addition or subtraction. In addition, a large number of switching and gating circuits are required, in order to perform the mathematical operation with accuracy. Furthermore, since operation on each digit of the number requires a plurality of signals and a plurality of steps, the complete mathematical operation is time-consuming and complicated.

The present invention discloses an electrical method and apparatus for performing mathematical operations, which overcomes the above and other disadvantages of the prior art machines. The basic component of the machine of this invention is a circulating memory having a predetermined cycle of operation which is divided into a plurality of divisions, one for each place of the number system. According to the present invention, each digit is represented by a single signal whose position in its respective division is representative of the magnitude of the digit. Mathematical operations on each signal are performed in a logical manner by displacing the signal in its division, the final position of the signal being indicative of the magnitude of the digit resulting from the mathematical operation.

More specifically, the calculating machine according to the present invention comprises electrical signal receiving means having a predetermined cycle of operation, and novel combinations of circuits for applying and reapplying time-displaced electrical signals to the receiving means in accordance with the magnitudes of the digits of the numbers upon which the machine is to operate. Thus, a plurality of initial signals are applied to or impressed upon the receiving means, the relative positions of these signals in the cycle of the receiving means representing the magnitudes of the digits, respectively, of one of the numbers. These initial signals are then removed and time-displacedly reapplied to the receiving means, the time displacement of each of the signals representing the magnitude of the corresponding digit of the other of the numbers.

Finally, in order to account for carry operations in the mathematical process, the reapplied signals are removed and again time-displacedly reapplied to the receiving means. Each of these latter time displacements is in accordance with the position of the reapplied signal in the cycle of the receiving means, and the position of the immediately preceding reapplied signal in the cycle. In this manner, both the mathematical carry operation of each pair of corresponding digits and the mathematical carry operation of the preceding pair of corresponding digits are converted into suitable electrical operations by the machine of the present invention.

The final result produced by the system is a series of electrical signals, one signal for each place digit. The position of each signal in the cycle of the receiving means corresponds to the magnitude of the corresponding digit in the solution of the mathematical operation. By dividing the cycle of the receiving means into a plurality of divisions, one for each digit, and applying and reapplying the corresponding signals in the appropriate divison, the final series of electrical signals represents the series of digits of the solution to the mathematical operation.

According to one basic embodiment of the invention, the signal receiving means comprises a rotatable magnetic drum having a band or track of magnetically retentive material. Signals are applied to the track through a plurality of magnetic recording or writing heads. Signals are removed from the track through a magnetic reading-while-erasing head, and reapplied to the track, after suitable time displacement, through a plurality of transfer writing heads. In the first instance, the time displacement is determined by a data conversion circuit responsive to the digits of the number to be added or subtracted. In the second instance, the time displacement is determined by the position of the removed signal in its division and the position of the removed signal in the immediately preceding division.

According to another basic embodiment of the invention, the signal receiving means comprises an acoustic delay line and a transducer for converting electrical signals into mechanical motion which sets up acoustic waves in the delay line. After the waves travel across the delay line they are converted into electrical signals by an output transducer. By dividing the cycle of the delay line into a plurality of divisions, one for each digit, and by employing suitable delay lines to time displace the electrcal signals, a mode of operation substantially the same as that outlined above may be attained.

It is, therefore, an object of this invention to provide an electrical method and apparatus employing time displacement of electrical signals to perform mathematical operations upon a pair of numbers.

Another object is to provide an electrical method and apparatus for performing mathematical operations in which the digits of one of the numbers to be operated upon are represented by a series of electrical signals, and in which each of the signals is time displaced in accordance with the magnitude of the corresponding digit of the other of the numbers upon which the machine is to operate.

Still another object of this invention is to provide an electrical method and apparatus for performing mathematical operations by shifting the positions of signals impressed in a rotating magnetic drum.

A further object of this invention is to provide an electrical method and apparatus for performing mathematical operations by delaying and advancing pulse signals traveling in an electrical-acoustical circuit.

An additional object of this invention is to provide a novel type of display circuit suitable for use with any calculating machine in which the final answer appears in the form of a series of electrical pulses having a definite time relationship which determines their significance.

Still another object of this invention is to provide means for shifting the position of the signals in a cyclically operable electrical signal receiving means, in accordance with the rules of addition and subtraction.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a functional block diagram of the calculating machine of this invention;

Fig. 2, comprising Figs. 2a, 2b, 2c, and 2d, is a schematic diagram of a magnetic drum calculating machine in accordance with the functional diagram of Fig. 1;

Fig. 3 is a perspective view of the drum and certain of the magnetic heads of Fig. 2;

Figs. 4a and 4b are composite diagrams of the waveforms of signals appearing at various points in the circuit of Fig. 2 during the operation of the machine;

Fig. 6 is a schematic diagram of a portion of the circuit of Fig. 5;

Fig. 7 is a composite diagram of the waveforms of the signals applied to the deflection yoke circuit of Fig. 6 and of the screen pattern produced thereby;

Fig. 8 is a diagram of the magnetic patterns of several digit producing inserts of Fig. 5 together with the screen patterns produced thereby;

Fig. 9 is a schematic diagram of one form of time stretcher circuit for use in the display circuit of Fig. 5;

Fig. 10 is a composite diagram of the waveforms of the signals appearing at various points in the circuit of Fig. 5;

Fig. 14 is a composite diagram of the waveforms of the signals appearing at various points in the circuit of Fig. 12;

Fig. 15 is a block diagram of an acoustic delay line calculating machine in accordance with the functional diagram of Fig. 1; and Fig. 16 is a block diagram of a modification of a portion of the machine of Fig. 15.

Figure 2C:
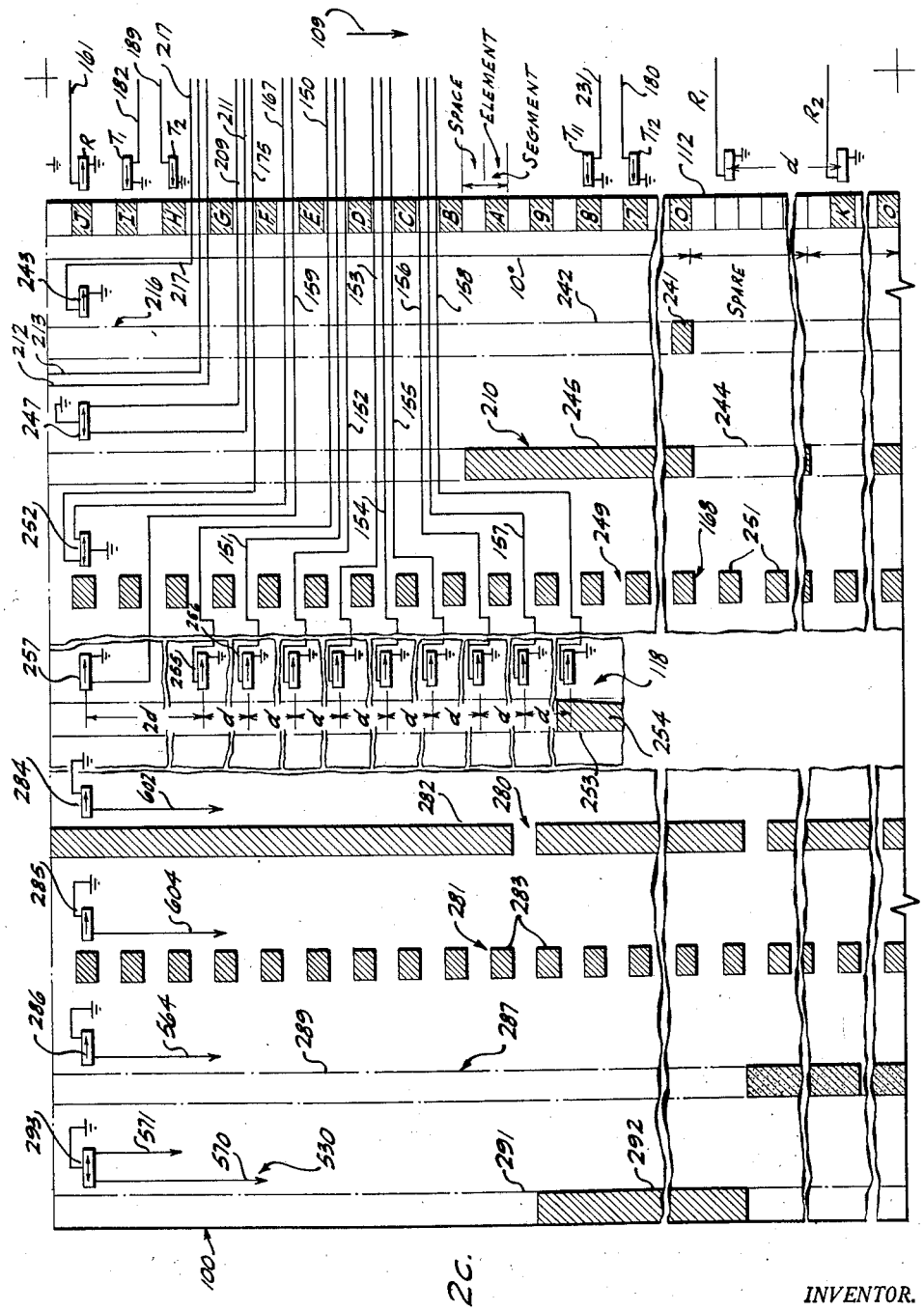

Referring now to Fig. 1, there is shown a block diagram of the functional components of the calculating machine according to the present invention. The central component of the machine is a circulating memory or signal receiving device 101 which has a predetermined cycle of operation. As explained more fully below, device 101 may be a rotatable magnetic drum having a rim of magnetically retentive material, in which case the cycle of operation corresponds to a single revolution of the drum. On the other hand, device 101 may be an acoustic delay line through which acoustic waves travel. In this instance, the cycle of operation corresponds to the travelling of a wave from one end of the line to the other. In either case, the cycle of operation is divided into a plurality of divisions, for the purpose described below.

Electrical signals are initially applied to or impressed upon device 101 by means of a signal impressing circuit 102 which is controlled from a data conversion circuit 103. Data conversion circuit 103, which may, for example, include a conventional keyboard, is arranged to receive the digits of the first number to be operated upon and to apply a series of signals to circuit 102. The time displacement of each signal from circuits 102 and 103, as it appears in the cycle of operation of device 101, represents the magnitude of the corresponding digit of the first number. The path of this first series of signals is indicated by 1.

After the first series of signals are applied to device 101, the machine is operated to remove the signals from device 101 and to time-displacedly reapply the signals in sequence, the time displacement of each signal being in accordance with the magnitude of the corresponding digit of the second number to be operated upon. The path of removal and reapplication of the signals is indicated by 2, and comprises a first signal removing circuit 104 and a first signal reimpressing circuit 105. As shown in Fig. 1, operation of circuit 105 is controlled by circuit 103 through path 2. In this instance, circuit 103 has received the digits of the second number and actuates circuit 105 in accordance with the magnitude of these digits.

The final step in electrically performing the mathematical operation is removal of the reapplied signals and time-displaced reapplication in accordance with the presence or absence of carry operations. This step is performed along path 3 which includes a second signal removing circuit 106 and a second signal reimpressing circuit 107. The details of this final time displacement are set forth fully below. Generally, for the present purposes, it is sufficient to state that circuit 107 is controlled by circuit 103 so that it reapplies each signal with any one of four predetermined time displacements. The particular displacement is determined by the position of the removed signal about a predetermined point in its division, and the position of the immediately preceding removed signal about a corresponding point in its division. These positions correspond, respectively, to the presence or absence of a carry digit in the mathematical step producing the removed signal and in the mathematical step producing the immediately preceding removed signal.

The final series of signals applied to device 101 then represents the digits of the number which is the solution to the mathematical operation of either addition or subtraction performed by the machine of the present invention. The remaining operation of the machine is to present the final series of signals as an indication to an observer. This operation is performed along path 4 by means of a signal indicating circuit 108 suitably coupled to device 101.

Referring now to Fig. 2, there is shown a schematic diagram of all of the signalling circuits illustrated in Fig. 1, together with signal receiving device 101 which forms a portion of a rotatable magnetic drum 100 having the direction of rotation indicated by arrow 109. As shown in Fig. 3, drum 100 is composed of an inner section 111 of a non-magnetic material such as duraluminum and a plurality of circumferential sections or tracks, such as track 112 which is composed of a magnetically retentive material of uniform density in which the signals are to be stored. Drum 100 may be continuously driven from any suitable source, such as motor 114 of Fig. 3.

A plurality of conventional magnetic heads, designated generally as 113 in Fig. 3, are magnetically coupled to track 112 in such manner as to utilize transverse magnetization, i. e., the signals impressed in track 112 consist of magnetizations of the material in a direction transverse to the direction of travel of drum 100 past the heads. As in conventional magnetic heads, a coil surrounds one section of each head and has two terminals to which electrical signals may be applied, or from which electrical signals may be removed. If the head, such as head R in Fig. 2c, encounters a previously installed magnetic signal in track 112, an electrical impulse will be received at the terminals. On the other hand, if an electrical signal is applied to the terminals, a magnetic signal will be impressed on or applied to that portion of track 112 which is directly beneath head R at the instant of application of the electrical signal.

The magnetic signals may be impressed on track 112 very close to each other, but, of course, there is some limit to the number of signals which may be installed and later distinguished, at the speed at which drum 100 is designed to rotate. It is assumed in the following discussion that the spacing of magnetic signals is in all cases sufficient to permit adequate discrimination between signals installed in adjacent linear portions of track 112 of drum 100.

Track 112 may then be considered to be composed of a series of linear portions or "elements," each of which may be separately magnetized in either of two ways, namely: North-South or South-North, which will hereinafter be designated as N or S, respectively. Each linear portion may be designated by a decimal digit, and the presence of that digit in a given linear portion of track 112 will be indicated by an N magnetization of that portion.

In Figs. 2a and 2c, adjacent linear portions or elements are separated by a blank space, that is a portion of track 112 in which no signal can be stored due to the arrangement of the switching circuits, as set forth below. In order to clarify the description that follows, the following terminology will be used throughout the remainder of the specification. An element is a portion of track 112 in which a signal can be stored. A space is a portion of track 112 in which no signal can be stored. A segment includes one element and the adjacent space, as shown in Fig. 2c.

As shown in Fig. 2, track 112 of drum 100 is divided into 11 subsections or divisions, each of the first ten divisions representing one decade in the decimal number system. The units decade is denoted by $10^0$, the tens decade by $10^1$, the hundreds by $10^2$, etc. The eleventh decade is a spare decade which is not used in performing the calculating operations, and is designated as such in Fig. 2c.

From Fig. 2a, which shows the tens decades of track 112, it can be seen that each decade is divided into 21 segments, each including an element and a space. The first ten elements in the direction of drum rotation are successively designated 0 to 9, while the last 11 elements are successively designated A to K. The purpose of the A to K elements will become apparent later. The total number of elements per decade becomes 21, and the total number of segments for the eleven decade machine is 231. If a distance along the circumference of 0.050 inch is assigned to each segment, a wheel of 3¾ inches diameter may be used. Obviously, where the numbers to be operated upon have more than ten places, a larger drum and a larger number of decades may be used.

It would be possible to use, for example, only one element for a decade and indicate the various digits by different degrees of magnetization. However, such a system would require discrimination between ten different output signals of different amplitudes, with a resultant increased complexity of associated circuits and lowered reliability. The machine employed in this invention uses more drum space to store the numbers, but uses simpler and more reliable associated circuits than would be used in a machine which discriminated between degrees of magnetization. In the machine disclosed here, sufficient current is passed through the coils to saturate the element of the track near the coil in either an S or N state of magnetization, depending on the direction of the current in the coil, i. e., sufficient current is used in the coil to magnetize the element nearest the head to a degree such that additional current would not affect the state of magnetization.

To perform operations on the digits represented by the magnetized elements, three types of head operation are used. These operations are as follows:

1. Writing is done by applying a pulse of current to the head in such polarity as to change the magnetization of a given wheel element from S to N. This operation is performed by heads $N_0$ through $N_9$, as shown in Fig. 2a, which are termed writing heads.

2. Reading While Erasing is done by passing a bias current through a reading head, designated R in Fig. 2c, before it arrives at the element which is to be read and erased. This bias current is in a direction which will cause an S magnetization of the element of track 112 nearest reading head R. Hence, reading head R leaves the elements magnetized in an S state unaffected, but if an element is encountered having an N state of magnetization, the state of this element will be reversed to an S state. This flux reversal produces a large inductive impulse in the head R and the resulting voltage pulse at the winding terminals indicates the passage of an N element. This impulse can be amplified and fed to a transfer writing head, such as $T_1$, $T_2$, $T_{11}$, $T_{12}$, of Fig. 2c to produce operation No. 1, namely, the reversing of some S element to N. The manner in which reading head R performs this operation is set forth below.

3. Reading Without Erasing is done by operating a reading head such as reading head $R_0$ of Fig. 2a, without any bias current so that the state of magnetization of the elements can be determined without changing the magnetization of the element. This operation is not used in calculating but only for reading out the result to the indicating device.

Writing heads $N_0$ through $N_9$ are connected through leads 120 through 129, respectively, as shown in Fig. 2b, to one set of fixed contacts of a switch 116, and through leads 130 through 139, respectively, to the other set of fixed contacts of switch 116. The movable contact of switch 116 is connected to a keyboard 117 through leads 140 through 149. Keyboard 117 consists of a matrix of wires, one wire for each of ten columns, connected, respectively, to leads designated $10^0$ through $10^9$, and one wire for each row, the rows being connected, respectively, to leads 140 through 149. The 0, 1, 2, . . . 9 buttons of each column are placed at the intersections of the wires forming the matrix. When a button is depressed, a contact is made between the two wires which cross beneath that button. For example, if the two button in the $10^0$ column is pressed, a circuit will be made from the output end of a gate $G_0$ through the junction of wires $10^0$ and 142 beneath the two button to switch 116 and then either to lead 122 or lead 137, depending on the position of the movable contact of switch 116.

Gates $G_0$ through $G_9$ are "and" gates, having their output ends connected to keyboard 117 through wires $10^0$ through $10^9$ representing the units, tens, hundreds, etc. columns of the keyboard, respectively. An "and" gate has the property of producing an output signal whenever a positive input signal is received on all of the input terminals of said "and" gate and of producing no output signal when a positive signal is present on less than all input terminals, or if no positive signal is received. The notation used in this and subsequent figures of this disclosure to represent an "and" gate is a semicircle with a dot inside, having its input leads entering the flatside of the semicircle and its output lead extending from the circular portion of the semicircle. "And" gates have two or more input terminals and one output terminal.

A decade commutator, generally designated 118 in

Fig. 2c, and explained in more detail later, has the property of sending out, in time sequence, electrical signals along leads 150 through 159, successively, one signal each time a decade on track 112 passes reading head R. As the 0 element of the units decade just reaches the R head, a signal will be applied to lead 150 and remain at a positive value until the space associated with the K element of the units decade passes the R head. As the 0 element of the tens decade just reaches the R head, a signal is applied to lead 151, and lead 150 no longer receives a signal. The signal received at each lead 150, 151, 152, ... 159 lasts during one entire decade, i. e., a positive signal is applied to each gate, $G_0$ $G_1$, ... $G_9$, successively for the time it takes for one decade of track 112 to pass the R head gates $G_0$, $G_1$, ... $G_9$ being connected to decade commutator 118 by leads 150, 151, ... 159, respectively.

A gate $G_{10}$, also an "and" gate, has its output terminal connected through a lead 119 to one input terminal of each of gates $G_0$, $G_1$, ... $G_9$. This completes the description of what may be termed the keyboard circuit, the input to the keyboard circuit coming through lead 119, and the output of the keyboard circuit being delivered at the $N_0$, $N_1$, ... $N_9$ heads.

Next, the R head of Fig. 2c and the signal shaping circuit connected therewith will be described. As set forth above, the R head is a reading head which performs operation No. 2, reading while erasing. The output of the R head is fed to an amplifier 160, shown in Fig. 2b, through a lead 161, shown in Figs. 2b and 2d. The output of amplifier 160 is applied to one fixed terminal of a switch 162 through lead 163. Switch 162 has its movable contact 164 connected to one input terminal of a gate $G_{11}$, shown in Fig. 2d, which is an "and" gate, through a lead 165. Gate $G_{11}$ has two other input terminals connected to leads 166 and 167, respectively.

A clock pulse source, designated generally as 168 in Fig. 2c, has its "clock-on" output end connected to lead 167. A cycle-on-source designated generally as 169 in Fig. 2b, has its output end connected through a lead 170 to lead 166. The cycle-on signal from source 169 is also applied to the input terminal of a bias voltage source including a vacuum tube 171, through lead 170. The output of the bias voltage source is applied to the input terminal of amplifier 160, and thus to the R head, by a lead 172 connected to lead 161, as shown in Fig. 2d.

The output terminal of gate $G_{11}$ is connected to the input terminal of a flip-flop circuit 173, shown in Fig. 2b, through a lead 174. A flip-flop circuit is a device having two stable states, such as the Eccles-Jordan circuit. Such devices are well-known in the art; see, e. g., Reich, "Theory and Applications of Electron Tubes," 1944, p. 353. These circuits have two input terminals and two output terminals. In this disclosure, a flip-flop circuit is indicated by a pair of circles with a cross between them, such as circuit 173. The input leads are connected to the ends of this two-circle configuration; the output leads are connected to the sides. Thus, as shown in Fig. 2b, the input leads to circuit 173 are leads 174 and 175, and the output lead is lead 176, circuit 173 having only one output.

The inputs and outputs are distinguished by the Roman numerals in the circles which also refer to the "state" or "position" of the flip-flop. Thus, circuit 173 has two states, I and II. The leads connected to a circle with a given designation such as I are called the I state input and output. Thus lead 174 is the I state input of circuit 173 and lead 176 is the II state output of Fig. 2. The flip-flop circuit has the property of producing a continuous positive output signal at the output lead corresponding to the input lead at which the most recent input pulse was received. Thus, a pulse received along lead 174, the I state input of circuit 173, will cause circuit 173 to flip to the I state if it previously had been in the II state, or to remain in the I state if that was its previous state. When circuit 173 is in the I state, a positive signal will be applied to the I state output, lead 176.

Returning to the description of Fig. 2b, the output of gate $G_{11}$ feeds into one input of flip-flop circuit 173, the I state input. The other input of circuit 173, the II state input, is connected to the "clock-off" output terminal of clock-pulse source 168 through lead 175, as shown in Figs. 2c and 2d, to receive clock-off pulses. The clock pulses produced by source 168 are reciprocal pulses which determine the length of the "elements" of track 112. The clock-on pulse lasts for the time it takes one element of track 112 to pass the R head. It is a positive signal during that time. The clock-off pulse is a pulse which is produced while the R head is between elements, that is while a space is passing the R head.

Circuit 173 will respond to positive input pulses only so that when a pulse is applied through lead 175, circuit 173 will flip to the II state, and when a pulse is received from gate $G_{11}$, by way of lead 174, circuit 173 will flip to the I state. When circuit 173 is in the I state, a positive signal will appear on lead 176 and be applied to a movable contact 177 of switch 162. This result occurs if three simultaneous signals are received on the three input terminals of "and" gate $G_{11}$, and the signal will last until a "clock-off" pulse is received at the II state input of circuit 173.

Switch 162 has two fixed terminals associated with contact 177, one terminal being connected by a lead 178, to a terminal 179 which in turn is connected to one input end of "and" gate $G_{10}$. The other fixed terminal associated with contact 177 is connected to transfer writing head $T_1$ through leads 181 and 182, as shown in Fig. 2d. It is thus seen that, with contact 177 of switch 162 in its lower position, any signal appearing on lead 176 will be applied directly to transfer head $T_1$. The significance of this arrangement will become apparent during the description of the operation of the machine, set forth below. On the other hand, with contact 177 in the position shown in Fig. 2, signals appear at terminal 179.

In addition to being connected to one input end of gate $G_{10}$, terminal 179 is connected through a lead 183 to one input terminal of an "and" gate $G_{12}$, and to leads 184, 185, and 186 which are, in turn, respectively connected to one input terminal of each of "and" gates $G_{13}$, $G_{14}$, $G_{15}$. As shown in Fig. 2d, each of gates $G_{12}$ through $G_{15}$ has four input terminals and a single output terminal. Gate $G_{15}$ has its output terminal connected through leads 187 and 182 to transfer writing head $T_1$ and to one input terminal of an "or" gate $G_{16}$, while gate $G_{14}$ has its output terminal connected through a pair of leads 188 and 189 to transfer writing head $T_2$, shown in Fig. 2c and to the other input terminal of gate $G_{16}$. The output terminals of gates $G_{12}$ and $G_{13}$ are connected through leads 180 and 231, respectively, to transfer writing heads $T_{12}$ and $T_{11}$ and to an "or" gate $G_{17}$ in a manner substantially identical to the connections of gates $G_{14}$ and $G_{15}$.

An "or" gate is a circuit which produces an output signal whenever a signal is applied to any of its input terminals. In Fig. 2, an "or" gate is indicated as a semi-circle with a cross in the middle. The output terminal of the "or" gate is on the circumference of the semi-circle, while the input terminals are located on the diameter.

From the above description, it can be seen that gates $G_{12}$ through $G_{15}$ provide the electrical signals utilized in writing by the transfer writing heads. The inputs to these gates are so arranged that only one gate produces an output signal at any given time, and, therefore, only one transfer head writes at any given time. The input circuits of gates $G_{12}$ through $G_{15}$, as shown in Fig. 2d, will now be described in detail.

The inputs to gate $G_{12}$ are applied along leads 183, 190, 191 and 192. Lead 183 is connected through lead 178 to the upper stationary terminal associated with contact 177 of switch 162, as set forth above, and applies the signal received from circuit 173 to gate $G_{12}$. Lead 190 is connected to the I state output terminal of a flip-flop circuit 193, while lead 191 is connected to the II state output terminal of a flip-flop circuit 194. The I state output terminal of a flip-flop circuit 195 is connected to lead 192. In this manner, a signal will appear at the output of gate $G_{12}$ only at that instance when a signal is received by the R head, circuits 193 and 195 are conducting in the I state, and circuit 194 is conducting in the II state.

Gate $G_{13}$ has its input terminals connected to leads 184, 196, 197 and 198, respectively. As set forth above, lead 184 is connected to lead 183 and applies the signal received at the R head to gate $G_{13}$. Lead 196 is coupled to the I state output terminal of circuit 193, while leads 197 and 198 are coupled, respectively, to the II state output terminal of a flip-flop circuit 199 and to the II state output terminal of circuit 195. In this manner, gate $G_{13}$ will produce an output signal only in the instance when a signal appears at the R head, circuit 193 is operating in the I state, and circuits 195 and 199 are operating in the II state.

The input terminal of gate $G_{14}$ are connected through leads 185, 200, 201 and 202 in the manner shown in Fig. 2d so that gate $G_{14}$ produces an output signal when circuits 193, 194 and 195 are operating in the I state, and a signal appears at the R head. Similarly, the input terminals of gate $G_{15}$ are connected through leads 186, 203, 204 and 205 so that gate $G_{15}$ produces an output signal when circuits 193 and 199 are operating in the I state, circuit 195 is operating in the II state, and a signal appears at the R head.

In summary, before any of gates $G_{12}$ through $G_{15}$ can produce an output signal, a signal must appear at the R head and circuit 193 must be operating in the I state. Under these conditions, gate $G_{12}$ will operate to apply a signal to transfer writing head $T_{12}$ when circuit 194 is operating in the II state and circuit 195 is operating in the I state. Similarly, gate $G_{14}$ will apply a signal to transfer writing head $T_2$ when circuits 194 and 195 are operating in the I state. A signal will be applied to transfer writing head $T_{11}$ through gate $G_{13}$ when circuits 195 and 199 are operating in the II state, while gate $G_{15}$ will apply a signal to transfer writing head $T_1$ when circuit 199 is operating in the I state and circuit 195 is operating in the II state.

It is thus apparent that only one of gates $G_{12}$ through $G_{15}$ will operate to transmit signals at any one instance. The manner in which circuits 193, 194, 195 and 199 control the operation of these gates will now be described in detail. Considering circuit 193, the I state input terminal of this circuit is connected to the output terminal of gate $G_{10}$ through lead 119, a lead 206, a delay circuit 207, and lead 208. Delay circuit 207 introduces a time delay equivalent to the time required for each of the segments of track 112 to pass the R head. The II state input terminal of circuit 193 is connected through a lead 209 to one output terminal of a decade pulse generator, designated generally as 210 in Figs. 2a and 2d. The II state output terminal of circuit 193 is connected to the other input terminal of gate $G_{10}$ through a lead 232.

In addition to the output terminal mentioned above, pulse generator 210 has three other output terminals. Connected to leads 211, 212, and 213, respectively as shown in Figs. 2a and 2c. Generator 210 is so arranged as to produce a series of four signals during the interval that each decade of track 112 passes the R head, each signal being in the form of a pulse having a time duration equivalent to the time required for one element of track 112 to pass the R head. A pulse appears on lead 209 during the interval when the 0 element of each decade is passing the R head and may be termed the 0 pulse. Similarly, pulses appear on leads 211, 212, 213 when the B, 1, and C elements of each decade pass the R head, respectively, and may be termed the B,1, and C pulses, respectively. The manner in which these pulses are generated will be described in detail below.

Returning to the description of the flip-flop circuits, circuit 199 has its I state input terminal connected to lead 209 to receive the 0 pulse from generator 210, and its II state input terminal connected to lead 211 to receive the B pulse from generator 210. Circuit 194 has its I state input terminal connected to lead 212 to receive the 1 pulse from generator 210, while lead 213 connects the II state input terminal of circuit 194 to generator 210 to apply the C pulse from generator 210 to circuit 194.

The state of conduction of circuit 195 is determined by any one of four different input signals. The initial state of circuit 195, that is its position just after the beginning of the cycle of operation of drum 100, is determined by the presence of a signal on either of leads 214 and 215 which are connected to the I and II state input terminals, respectively, of circuit 195. As shown in Fig. 2b, leads 214 and 215 are connected, respectively, to two stationary terminals of switch 116, the movable contact of switch 116 cooperating with the stationary terminals being connected to one output terminal of a cycle-on-pulse source, generally designated 216 in Fig. 2c, through a lead 217, as shown in Figs. 2c, 2d, and 2b. Source 216 produces a single positive pulse at the beginning of each cycle of operation of drum 100, that is each time the R head is positioned in alignment with the 0 element of the units decade of track 112. Since the positions of the movable contacts of switch 116 are determined by an "add" and "subtract" button, described more fully below, the initial state of conduction of circuit 195 will be determined by this button. A mode of operation of this button is indicated diagrammatically in Fig. 2 by a double-headed arrow 218. Thus, if an "add" operation is performed circuit 195 operates in the I state, while a "subtract" operation operates circuit 195 in the II state.

The remaining input signals to circuit 195 are applied from gate $G_{16}$, through a lead 219 and a delay circuit 220 to the I state input terminal, and from gate $G_{17}$, through a lead 221 and a delay circuit 222 to the II state input terminal. Each of delay circuits 220 and 222 is similar to delay circuit 207 and introduces a one element time delay. Accordingly, the final state of operation of circuit 195 is determined by gates $G_{16}$ and $G_{17}$, and, therefore, by the operation of gates $G_{14}$, $G_{15}$, or of gates $G_{12}$, $G_{13}$. Stated differently, if either of gates $G_{12}$ and $G_{13}$ produces an output signal, circuit 195 will operate in the II state, while the I state operation of circuit 195 is determined by the presence of an output signal in either of gates $G_{14}$ and $G_{15}$.

The only remaining circuit elements of Fig. 2 are those associated with cycle-on source 169. This source must receive an input signal to start it on its cycle as well as a recurrent pulse input from cycle-on-pulse source 216. The output terminal of source 216 is connected to one input terminal of source 169 through lead 217 and a lead 223. The "cycle-on" output of source 169 is a pulse of positive voltage lasting for the duration of one entire drum revolution. This pulse begins as the R head traverses the space between the K element of the last or spare decade and the 0 element of the first or units decade. It ends here also after one revolution.

The input signal used to start source 169 on its cycle is supplied through switch 162 which is connected to the other input terminal of source 169 by a lead 224, and through switch 116 which is connected to source 169 by a lead 225 and lead 224. The inputs of these two switches are supplied by a source of direct-current potential, such as a battery B, which has its positive terminal connected to one end of a resistor 226 and its negative terminal connected to ground. The other end of resistor 226 is connected to a lead 227 which is connected to one plate of a capacitor 228 having its other plate grounded. Lead 227 is connected to one stationary terminal of switch 162 and through a lead 229 to a pair of stationary terminals of switch 116.

Switch 116, as shown in Fig. 2b, has a normally open position and two closed positions, one position corresponding to addition, the other corresponding to subtraction, as indicated by arrow 218, described above. Switch 162 has the normal position indicated in Fig. 2b, the other position of switch 162 being obtained by pressing a "clear" button in the direction of movement indicated by an arrow 230. Thus, in a working model of this device, there would be, in addition to the keyboard buttons, an "add" button, a "subtract" button, and a "clear" button, each button being mechanically connected to several switches. The mechanical connections in this figure are indicated by the dotted lines, running between the switch blades of the switches.

Thus far, the various pulse sources have been described generally by stating the result desired. These pulse sources, as well as decade commutator 118 and other circuit elements of Fig. 2, will now be described in detail. The waveforms of all pulses are shown in Figs. 4a and 4b. The time axis has been foreshortened in Fig. 4a to show the decade pulses and the cycle signals on one related graph, this omission being indicated by the wavy section lines.

Referring now to Fig. 2c, there is shown one form of cycle-on pulse source 216. It should be remembered that source 216 was described as producing a single positive pulse each time the R head is positioned in alignment with the 0 element of the units decade. Accordingly, source 216 comprises an insert 241 of premagnetized magnetically retentive material in a second track 242 of drum 100, and a conventional magnetic reading head 243.

In operation, each time that insert 241 reaches head 243, a positive pulse will be induced in head 243, while a negative pulse is induced in head 243 each time element 241 has just passed the head. Accordingly, to produce the cycle-on pulse, insert 241 has a length equal to the length of one element of track 112, and, with head 243 aligned with head R as shown in Fig. 2c, insert 241 is aligned with the 0 element of the units decade of track 112.

The decade pulses may be produced in the same manner that the cycle-on "pulse" is produced. Thus, as shown in Figs. 2a and 2c generator 210 comprises a third track 244 of drum 100. Track 244 is divided into eleven decades just as is track 112. However, instead of one continuous band of magnetic material as track 112, track 244 includes 11 magnetic inserts, each 11 segments long, spaced 10 segments apart around the circumference. Two of such inserts are shown, insert 245 in Fig. 2c and insert 246 in Fig. 2a.

Two reading heads, 247 and 248, are used, each having a center tap to ground. The ends of these heads are connected to leads 209, 211, 212, and 213, as shown. Heads 247 and 248 are separated by an angular distance of one segment less than in integral number of decades. In Figs. 2a and 2c they are shown as separated by one decade less one segment, that is head 248 is aligned with the I element of the tens decade, as shown in Fig. 2a, while head 247 is aligned with the R head and the J element of the units decade. Obviously, the spacing could just as well be seven or any other number of decades less one segment.

The angular positions of the inserts in track 244 must be such that the front end of one of the inserts, 245 in Fig. 2c, just arrives at head 247 as the 0 element of the units decade of track 112 reaches the R head. Under these conditions, a positive pulse will be induced in head 247 and be applied through lead 209 as the 0 pulse, as shown in Fig. 4b. Eleven elements later the end of insert 245 will pass head 247 and induce a negative pulse therein. This negative pulse will be applied through lead 211 as the positive B pulse 423 in Fig. 4b.

Head 248 is displaced a distance equal to one decade less one segment from head 247 so that a positive pulse will be produced at lead 212 one element after the positive 0 pulse is produced at lead 209. This pulse, 419, as shown in Fig. 4b, is the 1 pulse. The C decade pulse, 424 in Fig. 4b, is the reciprocal of the 1 pulse, it being produced on lead 213 by the opposite side of the center tapped coil of head 248. The positive pulses of the 1 and C pulse trains properly occur when the R head is opposite the appropriate elements of track 112, as can be seen by the fact that the 1 element is spaced one element from the 0 element and the C element is spaced 12 elements from the 0 element. Circuits 193, 194 and 199 are affected only by positive pulses, hence the negative pulses which are produced by generator 210 are superfluous.

As set forth above, clock pulse source 168 is required to produce a positive signal for each element of each decade of track 112, and a negative signal for each space of track 112. Accordingly, one suitable form of source 168, as shown in Figs. 2a and 2c, comprises a track 249 having a plurality of permanently magnetized inserts 251, one element in length, spaced uniformly around track 249 with a space of non-magnetic material between each pair of inserts 251. A head 252 is center tapped, as shown in Fig. 2c, and supplies the clock-on pulse at lead 167 and the clock-off pulse at lead 175. It is clear that track 249 must be coordinated in design such that 21 inserts of track 249 fit in the same angular distance as one decade of track 112. Similarly, the spacing of the inserts on track 249 must conform to the spacing of the elements in track 112.

Referring now to Figs. 2a and 2c, there is shown one embodiment of decade commutator 118 which is particularly suited for the machine of this invention. As shown in the drawings, commutator 118 comprises a track 253 on drum 100, track 253 including a single permanently magnetized insert 254. For purposes of clarity of description, track 253 has been broken away from the other tracks of drum 100. Thus, Fig. 2a shows only a portion of one decade of track 253, while Fig. 2c shows the other ten decades plus the remaining portion of the one decade of track 253.

Insert 254 of track 253 has an overall length equal to one decade of track 112, and is tapered linearly from zero thickness at one end, as shown in Fig. 2a, to maximum thickness at the other end, as shown in Fig. 2c. Ten magnetic heads are distributed around track 253, as shown in Fig. 2c, these heads being separated by an angular distance $d$ equal to the distance of one decade of track 112. The first head 255 is so positioned relative to insert 254 that, when the 0 element of the units decade of track 112 is aligned with the R head, the tapered end of insert 254 is aligned with head 255. Similarly, since the second head 256 is angularly displaced angular distance $d$ from head 255, when the 0 element of the tens decade of track 112 is aligned with the R head, the tapered end of insert 254 will be aligned with head 256. As shown in Fig. 2c, the tenth head 257 is angularly spaced from head 255 a distance $2d$, to account for the spare decade of track 112.

In operation, as insert 254 passes head 255, the magnetic flux through head 255 increases linearly to a maximum, and then decreases abruptly to zero at the time insert 254 just arrives at head 256. Since the voltage output of a head is proportional to the rate of change of magnetic flux therethrough, head 255 will produce a constant positive output signal on lead 150, this signal having a duration of one decade of track 112. Accordingly, a positive signal of one decade duration will be applied to gate $G_0$ of Fig. 2b during the units decade interval of track 112.

A sharp spike of negative voltage will occur at the end of the positive voltage signal, but this negative voltage will not affect gate $G_0$. As insert 254 passes the subsequent heads it will generate similar positive voltage signals in each head successively, these signals being applied over leads 151 through 159 to gates $G_1$ through $G_9$, respectively. After the first ten decades of track 112 have passed the R head, no subsequent voltage impulses will be received at the keyboard gates $G_0$, $G_1$, ... $G_9$, until the units decade of the track 112 again arrives opposite the R head and insert 254 arrives opposite head 255.

The only remaining source of Fig. 2 which has not been described in detail is cycle-on source 169. As set forth above, source 169 is required to produce a positive signal of a duration equal to the time interval required for one revolution of track 112 or of drum 100. Fig. 2b shows one form of circuit suitable for source 169 in which source 216 is utilized to start and stop source 169.

Referring now to Fig. 2b, source 169 comprises a flip-flop circuit 261 having its I state input and output terminals connected, respectively, to lead 224 and to one input terminal of an "and" gate 262. As shown in Fig. 2b, lead 224 is connected to RC network 226, 228 whenever either switch 116 or switch 162 is actuated. Accordingly, a positive pulse will appear at the start of each cycle of operation of the machine, and flip circuit 261 to its I state.

In order to synchronize the operation of source 169 with the operation on track 112, the other input terminal of gate 262 is connected to lead 223 which in turn is connected to the output terminal of head 243 through lead 217. Therefore, when the R head reaches the 0 element of the units decade of track 112, the cycle-on pulse from head 243 will reach gate 262 which will operate to apply a positive signal to the I state input terminal of a flip-flop circuit 263. The I state output terminal of circuit 263 is connected to lead 170 and forms the output terminal of source 169.

The I state output terminal of circuit 263 also is connected to the II state input terminal of circuit 261 through a lead 264. The II state output terminal of circuit 261 is connected to one input terminal of an "and" gate 265. Accordingly, when circuit 263 is flipped to its I state, circuit 261 is flipped to its II state and applies a positive signal to gate 265.

The other input terminal of gate 265 is connected to lead 223 through a lead 266. Therefore, at the end of one revolution of drum 100, source 216 produces a second positive pulse which actuates gate 265. Since gate 265 has its output terminal connected to the II state input terminal of circuit 263, circuit 263 is flipped to its II state at the end of one cycle of operation. This completes the cycle of operation of source 169.

The only circuit elements of Fig. 2 not yet explained are the bias voltage source and amplifier 160. Amplifier 160 is an ordinary pulse amplifier capable of satisfactory reproduction of the pulses produced by the R head, and is well known in the art. One particular form of the bias voltage source, as shown in Fig. 2b, includes tube 171 having its grid connected to the output terminal of source 169 through lead 170. Grid bias is supplied by a battery 267 which has its positive side connected to the cathode of tube 171 and its negative side connected through a resistor 268 to the grid of tube 171. The plate of tube 171 is connected through a plate load resistor 269 to the positive side of a battery 271, which in turn has its negative side connected to ground. The cathode of tube 171 is connected to one side of a choke coil 272. The other side of coil 272 is connected to lead 172 which supplies the R head with the bias voltage, through lead 161 as shown in Fig. 2d.

In this circuit, coil 272 preferably should have an impedance approximately equal to the impedance of the coil of the R head at the lowest important frequency component of the pulse output of the R head. The purpose of coil 272 is to isolate high frequency components of the R head output signal from tube 171 and source 169. In operation, tube 171 is normally cut off so that no current flows through coil 272 and lead 172 to the R head. When the positive cycle-on signal is applied to the grid of tube 171, the tube conducts and draws current proportional to the cycle-on voltage. This current flows to ground through the R head and causes the required demagnetizing effect on N signals stored in track 112. Since the cycle-on voltage is essentially constant, the current flow to the R head will also be essentially constant. The value of the current drawn should be adjusted to a value sufficient to saturate the magnetic material in track 112 in an S direction.

OPERATION

The operation of the circuit of Fig. 2 can best be explained by following through an example of addition and one of subtraction, and pointing out the functioning of the various elements. The examples have been chosen so as to illustrate how the interhead connections are made and maintained for the proper amounts of time under all conditions of carry and non-carry mathematical operations.

The addition problem to be solved is:

$$\begin{array}{r} 2673 \\ +1792 \\ \hline 4465 \end{array}$$

This addition is carried out in six steps: (1) press the "clear" button; (2) install the number 2673 in the keyboard; (3) press the "add" button; (4) install the number 1792 in the keyboard; (5) press the "add" button a second time; (6) read off the answer.

Pressing the "clear" button moves switch 162 in the direction indicated by arrow 230 under the word "clear," to the position other than that in which the switches are shown in Fig. 2b. Accordingly leads 227 and 224 are interconnected by switch 162 and a pulse 400, as shown in Fig. 4a, is received from the RC network 226, 228 at source 169. Pulse 400, along with cycle-on pulse 401 initiates the cycle-on signal 402 which, as shown in Fig. 4a begins as the R head is in alignment with the beginning of the units decade. Signal 402 is applied through lead 170 to tube 171 and through leads 170 and 166 to one input terminal of gate $G_{11}$. Signal 402 remains on throughout the revolution of drum 100. Source 171 supplies a constant current through leads 172 and 161 to the R head for the duration of cycle-on signal 402. The R head will thus magnetize track 112 of drum 100 in the S direction.

Switch 162 also interconnects leads 165 and 212, thus applying pulses from head 248 of decade pulse generator 210 to gate $G_{11}$. The other input terminal of gate $G_{11}$ receives clock pulse signals along lead 167 from clock pulse source 168. As set forth above, source 168 produces one positive pulse for each element of track 112 and one negative pulse for each space. The waveform of the signal from source 168 is designated 403 in Figs. 4a and 4b. Since gate $G_{11}$ is an "and" gate, it will transmit a positive signal along lead 174 when there is a coincidence of positive signals on all three input leads 165, 166 and 167. This will occur once per decade, since lead 165 is supplied with 1 pulse 404 from decade pulse generator 210 through lead 212 and contact 164.

Accordingly, a pulse appears at the output terminal of gate $G_{11}$ and on lead 174 when the R head is aligned with the 1 element of each decade. Thus, once per decade, circuit 173 will be flipped to the I state where it will stay for one element's width, that is until a negative or clock off pulse from source 168 is applied through lead 175 to flip circuit 173 back to the II state. A pulse 405 of one element duration is then applied from circuit 173 through lead 176, contact 177, and leads 181, 192 to transfer head $T_1$. Since pulse 405 begins when the R head is aligned with the element and head $T_1$ is displaced one segment from the R head, as shown in Fig. 2c, pulse 405 will energize head $T_1$ as head $T_1$ is aligned with the 0 element. Head $T_1$ will then produce an N signal 406 in the 0 element of each of the decades of track 112 as they pass head $T_1$. After one revolution of drum 100, cycle-on signal 402 shuts off and no further signals can reach head T₁.

It is to be noted that the "clear" button must remain down for one full drum revolution for proper operation of this device. At the speed at which drum 100 would normally be designated to operate, it would be practically impossible for an operator to hold a button down for less than several drum revolutions because of the inherent slowness of human responses. If, however, it were desired to operate at a lower drum speed, a mechanical connection to hold the button down for at least one revolution would be required. The "clear" process is now complete.

Next the number 2673 is installed in keyboard 117 and the "add" button is pressed. Pressing the "add" button moves the movable contacts of switch 116 upward in the direction of arrow 218 under the word "add" in Fig. 2b into contact with the upper fixed terminals. Now a pulse is applied by RC network 226, 228 through lead 229, switch 116, and lead 225 to cycle-on source 169. Again, cycle-on signal 402 is applied through lead 170, starting as the 0 element of the units decade reaches the R head, as shown in Fig. 4b. The R head receives bias voltage and one input of gate G₁₁, lead 166, receives a positive signal. As before, lead 167 receives periodic positive signals 403 from source 168.

As drum 100 rotates, an N signal is encountered by the R head in the 0 element of the units decade. This signal is erased and a pulse applied through lead 161 to amplifier 160 which amplifies the pulse to a level utilizable to actuate an "and" gate. The amplified signal, designated 407 in Fig. 4b, is applied through lead 163, contact 164, and lead 165 to gate G₁₁. Since signals now appear on all three inputs of gate G₁₁, a pulse 408 is transmitted by gate G₁₁ through lead 174 to the I state input of circuit 173. Circuit 173 flips to the I state and a signal 409 is applied through lead 176, contact 177, and lead 178 to junction 179 and one input of gate G₁₀. Pulse 408 also is applied through lead 183 to one input of each of gates G₁₂ through G₁₅, but none of these gates can operate as yet.

In order to operate, gates G₁₂ through G₁₅ must receive a signal from circuit 193 through leads 190, 196, 200, and 203, respectively, and for this to occur circuit 193 must be in the I state. Circuit 193 is, however, in the II state as a result of the 0 pulse 410 just received from decade pulse generator 210 through lead 209. Since circuit 193 is in the II state, a positive signal 411 appears on lead 232 and hence on the other input of gate G₁₀. With a positive signal on both inputs, gate G₁₀ applies a signal 412 through leads 119 and 206 and delay circuit 207 to the I state input terminal of circuit 193. Delay circuit 207 delays signal 412 for the duration of one segment, so that when the R head is aligned with the 1 element, circuit 193 has been changed to the I state by delayed signal 413 and a positive signal 414 is applied to one input terminal of each of gates G₁₂ through G₁₅.

Signal 412 from gate G₁₀ also is applied through lead 119 to each of gates G₀, G₁, . . . G₉. Only the gate which simultaneously receives a signal from decade commutator 118 will transmit a signal to keyboard 117. This gate is gate G₀, a positive signal 415 being applied through lead 150 during the time the units decade is passing the R head. Hence a pulse is transmitted by gate G₀ along lead 10⁰, and, since the 3 button of this column is depressed, the signal will be applied through lead 143, switch 116, and lead 123 to head N₃. In the configuration shown in Figs. 2a and 2c, heads N₀ through N₉ are spaced one segment apart, with the head nearest the R head, N₀, being spaced two segments from the R head in a direction opposite the direction of drum rotation. Head N₃ is, therefore, opposite the 5 element of the units decade when the R head is opposite the zero element and hence head N₃ will write an N signal in the 5 element. This connection between the heads and the elements is illustrated diagrammatically as follows:

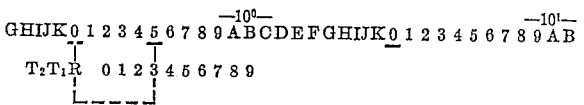

GHIJK 0 1 2 3 4 5 6 7 8 9 A B C D E F G H I J K 0 1 2 3 4 5 6 7 8 9 A B

T₂T₁R 0 1 2 3 4 5 6 7 8 9

To simplify the illustrations, symbols will be used to represent the heads, their interconnections, and the relationship of the heads to track 112. An element along track 112 will be represented only by its number, e. g., 5, A. Similarly, the reading and transfer heads will be represented only by their designations, e. g., T₂, R. To simplify the notation, however, the N heads, N₀, N₁, N₂, N₃, N₄, N₅, N₆, N₇, N₈, and N₉, will be represented simply by the corresponding number 0, 1, 2, 3, 4, 5, 6, 7, 8, and 9, respectively. The number of the decade, 10⁰, 10¹, etc. is indicated by the number above the elements comprising the decade. Connections between heads will be indicated by dotted lines.

Only the N state of magnetization will be indicated and that will be done by underlining the corresponding wheel element number, such as 5, or A. Thus a number not underlined means that the element having that designation is in the S state of magnetization; if it is underlined, it is in the N state of magnetization. A broken line under an element indicates that the magnetization of that element is in the process of being removed.

No further action takes place until the 5 element reaches the R head, at which time the N signal there is erased and a pulse from the R head is applied through lead 161 to amplifier 160. The amplified pulse 416 flips circuit 173 to the I state and a positive signal 417 appears at junction 179. However, since circuit 193 is in the I state, gate G₁₀ will not operate. Signal 417 is applied to one input terminal of each of gates G₁₂ through G₁₅, as was signal 409. Accordingly, each of gates G₁₂ through G₁₅, has positive signals on two of its input terminals. It now remains to be determined which of the gates has positive signals on its two other input terminals. Circuit 195 is in the I state as a result of a pulse applied through lead 214 to the I state input at the beginning of the cycle from cycle-on pulse source 216. Note that when the "add" button is depressed a signal is applied through lead 214 putting circuit 195 in the I state initially for addition, but when the "subtract" button is depressed circuit 195 has an initial II state, the cycle-on pulse being applied through lead 215 for subtraction. Circuit 195 applies a positive signal 418 through lead 202 to gate G₁₄, and through leads 202 and 192 to gate G₁₂, thereby making it possible for either gate G₁₂ or G₁₄ to fire, but not G₁₃ or G₁₅. Hence, it is immaterial what state circuit 199 is in, and circuit 194 determines the gate which will conduct.

The most recent pulse which arrived at circuit 194 is the 1 pulse 419, hence circuit 194 is in the I state, as shown at 420 in Fig. 4b, and gate G₁₄ will conduct. A signal will then be applied through leads 188 and 189 to head T₂, and, since head T₂ is spaced one segment from head T₁ and is now opposite the 3 element of the units decade, an N signal 422 will be installed in that element. This result is illustrated diagrammatically as follows:

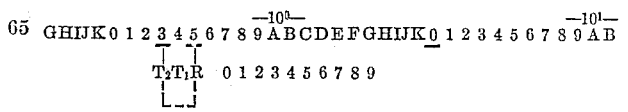

GHIJK 0 1 2 3 4 5 6 7 8 9 A B C D E F G H I J K 0 1 2 3 4 5 6 7 8 9 A B

T₂T₁R 0 1 2 3 4 5 6 7 8 9

The signal from gate G₁₄ also is supplied to gate G₁₆ through lead 188. Since gate G₁₆ is an "or" gate, a signal will be applied through lead 219 and delay circuit 220 to the I state input of circuit 195. Since circuit 195 is already in the I state, this signal will have no effect. Accordingly, the first number to be added is now installed in the units decade.

Drum 100 now travels on until the 0 element of the tens decade reaches the R head. The N signal in this element, installed in the "clear" process, is now erased and a pulse is applied through lead 161 to amplifier 160. As before, gate G11 transmits a signal to circuit 173 and the output of circuit 173 is applied to gate G10. With circuit 193 flipped to the II state by the 0 pulse just received as the tens decade arrived at the R head, gate G10 is actuated and applies a signal through delay circuit 207 to circuit 193, flipping circuit 193 back to the I state where it remains for the rest of the tens decade.

The signal from circuit 173 is also applied to gates G0, G1, ... G9 and causes gate G1, the gate now receiving a signal from decade commutator 118, to transmit a signal along lead 191. The 7 button in the $10^1$ column is depressed, thus permitting the output signal from gate G1 to be applied through lead 147, switch 116 and lead 127 to head N7. Head N7 is opposite the 9 element of the tens decade when it receives the signal on lead 127, and will install an N signal in the 9 element.

When the R head reaches the 9 element of the tens decade it erases the N signal, applies a signal to amplifier 160, which, as before, produces a signal at junction 179. Circuits 193, 194, 195, and 199 are in the same states as they were when the transfer was made in the units decade, hence, transfer here will occur in precisely the same way as before. Head T2 will receive a signal from gate G14 and install an N signal in the 7 element of the tens decade.

The only difference between the operations already described and the operations which occur in the hundreds, thousands, and subsequent decades is the path of the signal from circuit 173 through keyboard 117 to one of the N0, N1, ... N9 heads. The path in each case depends simply on which button of keyboard 117 is depressed. In the example, the 6 button in the hundreds decade, the 2 button in the thousands decade, and the 0 button in the subsequent decades were depressed. When the end of the spare decade passes the R head the cycle-on signal from source 169 shuts off and the R head is de-energized.

The machine is now ready for the second number, 1792, which is now entered on keyboard 117. Depression of the button representing the second number automatically releases the buttons representing the first number. This result may be achieved in any well-known manner. The "add" button is now depressed, causing a pulse from RC network 226, 228 to initiate the cycle-on signal which begins as the units decade starts to pass the R head. The R head encounters the first N signal in the 3 element of the units decade. A pulse is applied to amplifier 160 and as in the previous case, completes a circuit through gate G0 to keyboard 117. With the 2 button of the $10^0$ column depressed, a signal is applied to head N2. This installs an N signal in the 7 element of the units decade, as indicated diagrammatically below:

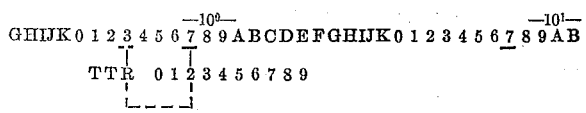

As before, when the R head reaches the N signal in the 7 element, transfer takes place in this case, the transfer will be made of the signal in the 7 element back to the 5 element through the head T2, thus

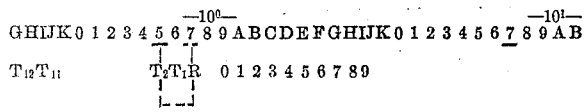

Transfer takes place via head T2, as before, to the 5 element.

The tens decade reaches the R head next and the first signal to be encountered by the R head is in the 7 element of this decade. A circuit is now made through keyboard 117 to head N9 and this causes a magnetization of the I element of the tens decade as follows:

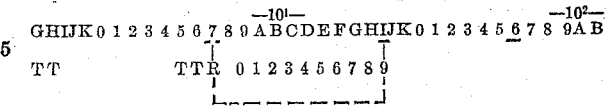

When the R head reaches this I element, transfer takes place. Before proceeding with an analysis of the circuit connections for completing the transfer, it should be noted that the two numbers to be added in the tens decade are 7 and 9. The mathematical summation of these two numbers results in a 6 with a "carry." Furthermore, the previous addition in the units column, 2 plus 3, produced no "carry." Accordingly, with the interhead spacings illustrated in Fig. 2c, that is with heads T11 and T12 spaced 11 and 12 segments, respectively, from the R head in the direction of drum rotation, transfer during the addition process should take place through transfer head T12 when the addition produces a carry, and the previous addition produced no carry.

Returning now to the circuit of Fig. 2, the pulse produced at the R head is applied through lead 183 to one input terminal of each of gates G12 through G15. As before, circuits 193 and 195 are in their I states. However, circuits 194 and 199 are both in their H states, the most recent pulses received by these circuits being C and B, respectively. Under these conditions, only gate G12 is effective and transmits a signal to head T12. The signal from gate G12 is also applied to circuit 195 through "or" gate G17, lead 221, and delay circuit 222, thus flipping circuit 195 to the II state. The result of this transfer is the installation of an N signal in the 6 element of the tens decade, as follows:

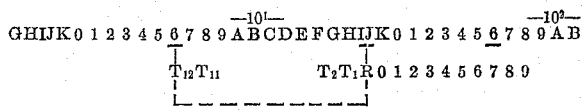

The next operation in the hundreds decade must take the carry produced by this addition in the tens decade into account. The magnetized element in the hundreds decade which actuates the R head is the 6 element. A circuit is now made to head N7 through keyboard 117, putting an N signal in the F element of the hundreds decade.

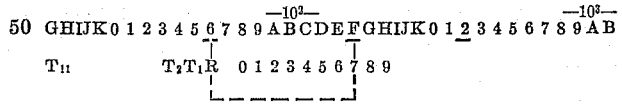

It should be noted that the mathematical operation to be performed in the hundreds decade is 6 plus 7. This addition results in a 3 with a carry. Furthermore, the previous operation in the tens decade produced a carry. Accordingly, with the interhead spacings of Fig. 2, transfer should take place through transfer head T11.

Referring now to the circuit of Fig. 2, circuit 195 is, in this case, in the II state as a result of the signal from the previous transfer operation. It is seen that whenever the transfer occurs through heads T11 or T12, circuit 195 is left in the II state, while transfer through heads T1 or T2 leaves circuit 195 in the I state. In this instance, since circuit 195 is in the II state, positive signals are applied to gates G13 and G15, and the state of circuit 199 controls the gate operation. Now, since the most recent pulse from generator 210 to circuit 199 is B, circuit 199 is in the II state and gate G13 is operative. Thus, head T11 receives a signal from gate G13 and a signal is written into the 4 element of the hundreds decade. As in the previous operation, a signal is applied through gate G17 to circuit 195 to maintain circuit 195 in the II state. The diagram of the transfer is as follows:

```
                   —10²—                                    —10³—
GHIJK 0 1 2 3 4 5 6 7 8 9 A B C D E F G H I J K 0 1 2 3 4 5 6 7 8 9 A B
       T₁₂T₁₁          T₂T₁R   0 1 2 3 4 5 6 7 8 9
       └─────────────────┘
```

Again, a carry was produced by the addition of 6 plus 7 and the next operation must take this carry from the hundreds decade into account. As the thousands decade passes the R head, the R head makes a circuit through keyboard 117 to head N₁, and writes ahead the N signal appearing in the 2 element to the 5 element as shown below.

```
                   —10³—                                    —10⁴—
GHIJK 0 1 2 3 4 5 6 7 8 9 A B C D E F G H I J K 0 1 2 3 4 5 6 7 8 9 A B
       T₂T₁R   0 1 2 3 4 5 6 7 8 9
       └─┘
```

In the thousands decade, the numbers to be added are 2 plus 1. However, since a carry resulted from the operation in the hundreds decade, the solution to this addition should be 4. In other words, with no carry in the present addition, and a carry in the previous addition, transfer should take place through transfer head T₁. Since circuit 195 is in the II state, and circuit 199 is in the I state due to the 0 pulse, gate G₁₅ will be actuated and apply a signal to transfer head T₁ and to gate G₁₆. Gate G₁₆ flips circuit 195 to the I state, and head T₁ impresses a signal on the 4 element of the thousands decade as follows:

```
                   —10³—                                    —10⁴—
GHIJK 0 1 2 3 4 5 6 7 8 9 A B C D E F G H I J K 0 1 2 3 4 5 6 7 8 9 A B
       T₂T₁R   0 1 2 3 4 5 6 7 8 9
       └┘
```

When the 10⁴ decade reaches the R head, the signal in the 0 element is applied to keyboard 117 and, since the 0 button in the 10⁴ column of keyboard 117 is depressed, a circuit is completed to head N₀ through leads 120, 140 and switch 116. An N signal is, therefore, impressed on the 2 element. When the R head reaches the 2 element, circuit 195 is in the I state, as set forth above, and circuit 194 is in the I state as a result of the 1 pulse. Accordingly, transfer takes place through transfer head T₂ and a signal is reinserted in the 0 element. In all subsequent decades, the 0 signals are impressed on the 2 elements by head N₀ and transferred back to the 0 elements by transfer head T₂. Finally, at the completion of the cycle, source 169 is de-energized and thereby de-energizes the R head. The answer recorded in track 112 is, therefore, 4465.

This completes the description of one example of the addition process performed by the machine of this invention. It should be noted that in each of the steps of the addition process, the initial operation is the removal of a signal by the R head and a reapplication of a signal by one of the heads N₀ through N₉ by means of a circuit through amplifier 169, gate G₁₁, circuit 173, keyboard 117 and switch 116. The point of reapplication of each signal is determined by which button of keyboard 117 has been depressed, and, therefore, in accordance with the corresponding digit of the number in keyboard 117. Stated differently, the initial operation is a displacement of each signal in the cycle of operation of drum 100 in accordance with the corresponding digit of the number to be added.

A transfer process is employed in order to account for any carry digits. This transfer occurs by removing the displaced signals and displacedly reapplying each signal with a selected one of four displacements. The displacement is determined automatically by the operative states of circuits 194, 195, and 199. The states of circuits 194 and 199 are determined by decade pulse generator 210. Stated differently, the states of circuits 194 and 199 are each determined by the most recent pulse received from generator 210 at the instant the R head removes the signal from the energized element of track 112. Thus, for each decade, circuit 194 is in the I state if the signal to be removed is positioned above element B, as viewed in Fig. 2, and in the II state if the signal is positioned below element B. Similarly, for each decade, the position of the signal to be removed relative to element B determines the state of circuit 199.

The initial state of circuit 195 is determined by the position of switch 116. In addition, circuit 195 is always initially in the I state. Changes in the operative state of circuit 195 are controlled by gates G₁₆ and G₁₇, which in turn depend upon the transfer operation in the previous decade. In other words, the operative state of circuit 195 is controlled by whether or not the addition process in the previous decade produced a carry, that is, whether or not the signal removed from the previous decade was above or below element B, as viewed in Fig. 2. As pointed out above, a carry in the previous addition produces a transfer through head T₁₁ or T₁₂, while no carry in the previous addition produces a transfer through head T₁ or T₂. Accordingly, if a carry had occurred, gate G₁₇ is actuated and circuit 195 is flipped to the II state, while gate G₁₆ is actuated if no carry occurs and circuit 195 remains in the I state.

A subtraction problem will now be considered, this problem being:

$$\begin{array}{r} 3358 \\ -1972 \\ \hline 1386 \end{array}$$

The steps involved in performing this subtraction are as follows: (1) press the "clear" button; (2) install the number 3358 in the keyboard; (3) press the "add" button; (4) install the number 1972 in the keyboard; (5) press the "subtract" button; (6) read off the answer. The circuit connections which are involved in the first four steps are of the same types as those involved in an addition. These will not be traced out again. It is assumed that the number 3358 now appears in the appropriate elements of track 112, and that the number 1972 appears in keyboard 117.

When the "subtract" button is depressed, the movable contacts of switch 116 are moved downward in the direction of the arrow above the word "subtract" in Fig. 2b. A pulse from RC network 226, 228 is applied through lead 229, switch 116, and lead 225 to cycle-on source 169. The cycle-on signal is supplied to the R head, as before, through the bias source, starting as the R head reaches the 0 element of the units decade. The cycle-on signal is also supplied to gate G₁₁ so that gate G₁₁ can operate whenever signals are also received on leads 165 and 167, during the remainder of the cycle. Lead 167 receives positive signals, as each element of track 112 passes the R head, from clock pulse source 168. An N signal is encountered by the R head in the 8 element of the units decade, and the R head erases this signal and transfers a signal to keyboard 117 in the manner described above in connection with the addition process.

The 2 button of the 10⁰ column of keyboard 117 is depressed, so the signal at keyboard 117 will appear on lead 142. With switch 116 in the "subtract" position lead 142 is connected to lead 137 and the signal will be applied to head N₇. Head N₇ is opposite the H element of the units decade so an N signal is installed in this element.

The circuit is now ready for the transfer process to take place when an N signal is next encountered by the R head. When the R head reaches the H element, the signal there is erased and a signal is applied through lead 161, amplified, and transmitted through gate G₁₁ to circuit 173. Circuit 173 is flipped to the I state and applies a signal through lead 183 to gates G₁₂ through G₁₅. These gates receive positive signals from circuit 193 through leads 190, 196, 200, and 203, respectively. Circuits 194 and 199 are both in their II states, so gates $G_{12}$ and $G_{13}$ receive signals through leads 191 and 197, respectively. Circuit 195 has been fixed in the II state by the signal from source 216 which was applied through lead 215 when the "subtract" button was depressed initially. Gate $G_{13}$ is, thus, the only gate receiving signals on all four inputs, and will apply a signal to head $T_{11}$. Head $T_{11}$ is opposite the 6 element when the R head is opposite the H element so an N signal is installed in the 6 element, as required to give the answer of 8—2.

Drum 100 now travels on until the 5 element of the tens decade reaches the R head. As before, a signal is sent out through keyboard 117, this time to head $N_2$, through the 7 button, lead 147, switch 116 and lead 132. Head $N_2$ is opposite the 9 element of the tens decade when the R head is opposite the 5 element so an N signal is written in the 9 element.

It is to be noted that the subtraction of 7 from 5 results in an 8 with a carry. Furthermore, no carry resulted from the previous subtraction in the units decade. Transfer must now take place through head $T_1$ to give the correct answer. When the R head arrives at the 9 element a positive signal is applied to one input of each of gates $G_{12}$ through $G_{15}$, as described above. Circuit 193 is in the I state, due to the pulse which was received one element after the R head reached the 5 element, and also applies a positive signal to an input terminal of each of gates $G_{12}$ through $G_{15}$. Since the last transfer took place through head $T_{11}$, circuit 195 is in the II state, and gates $G_{13}$ and $G_{15}$ receive signals from circuit 195. Therefore, circuit 199 controls gate operation and, since the most recent decade pulse is the 0 pulse, gate $G_{15}$ will be actuated and apply a signal to head $T_1$. Head $T_1$ thus causes an N signal to be written in the 8 element of the tens decade, as required.

Next, the R head arrives at the 3 element of the hundreds decade. The 9 button of the $10^2$ column of keyboard 117 is depressed and a signal is applied through head $N_0$ to the 5 element. In this case, transfer is by way of head $T_2$ back to the 3 element. The only difference between the operation of the transfer circuit in the hundreds decade and that in the tens decade is that circuit 195 is in the I state as a result of the previous transfer through head $T_1$. In other words, where there is a carry in both the present decade and the previous decade, transfer occurs through head $T_2$ in the subtraction process.

The operation in the thousands decade includes applying a signal through head $N_8$ to the D element and transferring back to the 1 element through head $T_{12}$. The only difference between the transfer in the thousands decade is that circuit 194 is in the II state instead of the I state, and as a result, gate $G_{12}$ is energized. Gate $G_{12}$ also applies a signal through gate $G_{17}$ to circuit 195 flipping circuit 195 into its II state.

As the subsequent decades pass the R head, the N signal in the 0 element energizes head $N_9$ to apply a signal to the B element and then the signal is transferred back to the 0 element through head $T_{11}$.

In summarizing the operation of the circuit illustrated in Fig. 2, it should be noted that the transfer head utilized, and therefore, the amount of displacement of each signal in its decade, depends upon two factors: (1) the position of the signal to be removed with respect to a predetermined point in its decade; and (2) the position of the previously removed signal in its decade. The first factor, in either addition or subtraction, represents the presence or absence of a carry in the mathematical operation being performed in the decade in question. The second factor represents the presence or absence of a carry in the mathematical operation performed in the immediately preceding decade.

Utilizing the symbol S to represent the sum of the two digits in the decade in question, and the symbol D to represent the difference between the two digits in the decade, the transfer operation may be tabulated as a function of the two factors as shown below in Table I.

*Table I*

| Present Operation | | Position of Signal to Be Removed | Previous Operation | | Position of Signal Removed | Transfer Head to be Used |
|---|---|---|---|---|---|---|
| S | D | | Carry | | | |
| | | | Add | Subtract | | |
| <9 | <0 | 2 to A | No | Yes | 2 to B | $T_2$ |
| =9 | =0 | B | No | Yes | 2 to B | $T_3$ |
| >9 | >0 | C to K | No | Yes | 2 to B | $T_{12}$ |
| <9 | <0 | 2 to A | Yes | No | B to K | $T_1$ |
| =9 | =0 | B | Yes | No | B to K | $T_{11}$ |
| >9 | >0 | C to K | Yes | No | B to K | $T_{11}$ |

A tabulation of the positions of the various flip-flop circuits of Fig. 2 as a function of the variables listed in Table I is presented below in Table II.

*Table II*

| Previous Operation | | | | | Present Operation | | | | | |
|---|---|---|---|---|---|---|---|---|---|---|
| Position of Signal | Carry | | Transfer Head Used | | State of Circuit 195 | Position of Signal To Be Removed | Most Recent Pulse at— | | State of Circuit | | Transfer Head Used |
| | Add | Subtract | Add | Subtract | | | 194 | 199 | 194 | 199 | |
| 2 to A | No | Yes | $T_2$ | $T_1$ | I | 2 to A | 01 | KO | I | I | $T_2$ |
| 2 to A | No | Yes | $T_2$ | $T_1$ | I | B | 01 | AB | I | II | $T_2$ |
| 2 to A | No | Yes | $T_2$ | $T_1$ | I | C to K | BC | AB | II | II | $T_{12}$ |
| B | No | Yes | $T_2$ | $T_1$ | I | 2 to A | 01 | KO | I | I | $T_2$ |
| B | No | Yes | $T_2$ | $T_2$ | I | B | 01 | AB | I | II | $T_2$ |
| B | No | Yes | $T_2$ | $T_2$ | I | C to K | BC | AB | II | II | $T_{12}$ |
| B | Yes | No | $T_{11}$ | $T_{11}$ | II | 2 to A | 01 | KO | I | I | $T_1$ |
| B | Yes | No | $T_{11}$ | $T_{11}$ | II | B | 01 | AB | I | II | $T_{11}$ |
| B | Yes | No | $T_{11}$ | $T_{11}$ | II | C to K | BC | AB | II | II | $T_{11}$ |
| C to K | Yes | No | $T_{12}$ | $T_{11}$ | II | 2 to A | 01 | KO | I | I | $T_1$ |
| C to K | Yes | No | $T_{12}$ | $T_{11}$ | II | B | 01 | AB | I | II | $T_{11}$ |
| C to K | Yes | No | $T_{12}$ | $T_{11}$ | II | C to K | BC | AB | II | II | $T_{11}$ |

As explained above, the initial state of circuit 195 is set by the cycle-on pulse which is received at the beginning of an operating cycle along either lead 214 or 215. When the "add" button is pressed, a pulse is applied through lead 214 to insure that circuit 195 is in the I state initially for addition. When the "subtract" button is pressed, a pulse is applied through lead 215 to insure that circuit 195 is in the II state initially for subtraction. Thereafter, during each decade of a cycle of operation of drum 100, the state of operation of circuit 195 is determined by the transfer head used in the previous operation, as indicated in Table II. A comparison of Tables I and II reveals that both the addition and subtraction transfer processes are carried out properly by the circuit of Fig. 2 under all conditions.

Referring again to Figs. 1 and 2, the operation of the circuit of Fig. 2 may be summarized as follows:

(1) A series of signals are impressed on or applied to signal receiving device 101 by circuit 102, the position of each signal in its division or decade of the cycle of operation of device 101 being in accordance with the magnitude of the corresponding digit of the first number to be operated upon and being controlled by data conversion circuit 103. Accordingly, circuit 102 comprises heads $N_0$ through $N_9$, the R head, and transfer head $T_2$ in addition, or transfer head $T_1$ in subtraction. Data conversion circuit 103 comprises keyboard 117, switch 116, decade commutator 118 and gates $G_0$ through $G_9$.

(2) Each of the series of signals is removed by circuit 104 and displacedly reapplied to device 101 by circuit 105, the displacement of each reapplied signal being in accordance with the magnitude of the corresponding digit of the second number to be operated upon. Circuit 105 includes heads $N_0$ through $N_9$, while circuit 104 includes the R head, the bias source and source 169.

(3) Each of the displaced signals is removed by circuit 106 and displacedly reapplied to device 101 by circuit 107, this displacement being in accordance with the position of the displaced signal in its decade and the position of the immediately preceding removed signal in its decade. Circuit 106 is substantially the same as circuit 104, while circuit 107 comprises transfer heads $T_1$, $T_2$, $T_{11}$, and $T_{12}$, gates $G_{12}$ through $G_{17}$, and the flip-flop circuits. Data conversion circuit 103 controls the operation of circuit 107 through switch 116 and source 216.

As shown in Table II, the point in each decade which is significant in determining the final displacement of the signal by circuit 107 is the B element. Thus, if the signal to be removed is positioned in any of elements 2 through A, final transfer, in either the addition or subtraction process, is through either head $T_2$ or head $T_1$. On the other hand, if the signal to be removed is positioned in any of elements C through K, final transfer, in either mathematical process, is through either head $T_{12}$ or head $T_{11}$. In the addition process, positions 2 through A correspond to no carry in the present operation, while positions C through K correspond to a carry in the present operation. Conversely, in the subtraction process, a carry is present if the signal to be removed is in any of positions 2 through A, while no carry is present if the signal is in any of positions C through K.

The selection of one of the pair of transfer heads is determined by the relative position of the removed signal in the immediately preceding decade. This variable is listed in the first column of Table II. Again, the controlling point is the B element, and the position of the removed signal on either side of this element corresponds to the presence or absence of a carry, as noted in the second column of Table II.

The only remaining group of possible positions is that of a signal in the B element in either the present or previous operation. In the addition process, this condition corresponds to $S=9$, while in the subtraction process, the condition corresponds to $D=0$, both as shown in Table I. If the signal to be removed in the present operation is in the B element, transfer will occur through either head $T_2$ or head $T_{11}$, depending on the position of the immediately preceding removed signal, as shown in Table II. Mathematically, the final displacement depends upon the presence of a carry in the previous operation so as to produce a carry in the present operation. For example, if the addition problem were 74+29, transfer in the tens decade would take place through head $T_{11}$ because of the carry in the units decade. That this result is attained by the circuit of Fig. 2 may be verified by checking Table II. On the other hand, if the addition problem were 74+23, transfer in the tens decade would take place through head $T_2$ because of the absence of a carry in the units decade. Other examples may be chosen to verify Table II, and to demonstrate the applicability of the circuit of Fig. 2 to any and all possible mathematical operations of addition and subtraction.

It has been shown that the circuit of Fig. 2 is capable of performing mathematical operations of addition and subtraction with the illustrated arrangement of reading, writing and transfer heads. Thus, with the position of the R head chosen as a reference point, satisfactory operation of the circuit of Fig. 2 can be attained with ten writing heads $N_0$ through $N_9$ disposed in series above the R head, and four transfer heads $T_1$, $T_2$, $T_{11}$ and $T_{12}$, disposed below the R head, all as viewed in Fig. 2. Stated differently, writing heads $N_0$ through $N_9$ are displaced from the R head in a direction reverse to the direction of rotation of drum 100, as indicated by arrow 109, while the transfer heads are displaced from the R head in the direction of drum rotation. Heads $N_0$ through $N_9$ are equally spaced one segment apart, with the nearest head, $N_0$, being spaced two segments from the R head. Transfer heads $T_1$, $T_2$, $T_{11}$, and $T_{12}$ are spaced one, two, eleven and twelve segments, respectively, from the R head.

It is considered that this head configuration is the optimum, both from the standpoint of simplicity of switching circuits and of efficient utilization of drum space. It should be understood, of course, that other head configurations may be devised without departing from the spirit and scope of the invention. Thus, the spacing between the various heads could be lengthened, but this would require increasing the number of elements in each decade and altering pulse generator 210. On the other hand, if the spacing between the R head were shortened to one element, head $T_1$ would have to be aligned with the R head or the same head would be used for reading and writing. Although these and other changes are considered to be within the scope of this invention, the head configuration disclosed in Fig. 2 is deemed to be the preferred embodiment.

It should also be noted at this point, that, while the discussion thus far has been limited to the addition and subtraction of decimal numbers, there is obviously no such inherent limitation in the devices disclosed. Any system of numbers in which a positional notation is used could equally well be employed, such as the binary system. To adapt the device here explained, for example, to a system of numbers employing seven digits, it would simply be necessary to use seven rather than ten writing heads and a corresponding number of elements in track 112.

DISPLAY CIRCUIT

When the machine shown in Fig. 2 is to be used as a desk calculator, it is desirable to have a method and means of displaying to the operator of the machine the result of each operation which he performs. In a mechanical system, this display function may be performed by imparting mechanical motion to a drum which has the decimal digits printed on it. The final position of the drum is then observed through a window which only shows one digit. A similar type of system consists in imparting motion to the appropriate one of ten keys which prints the answer on a strip of paper. Either of these standard techniques could be employed in displaying the results of this device by converting the electrical signals which appear on track 112 into mechanical motion. This result could be accomplished by applying these signals to small solenoids, for example.

It is preferable, however, to have a small electrical display mechanism, having no inertia, which is described below. In this all-electrical system, the numbers are displayed on small cathode ray tubes, the signals appearing on track 112 being used to control the signals which are applied to the cathode ray tubes. The signals which are applied to the cathode ray tubes cause the beams of the tubes to trace out the decimal digits on the faces of the tubes, the digit traced out corresponding to the digits then in the various decades of track 112.

Figure 5:
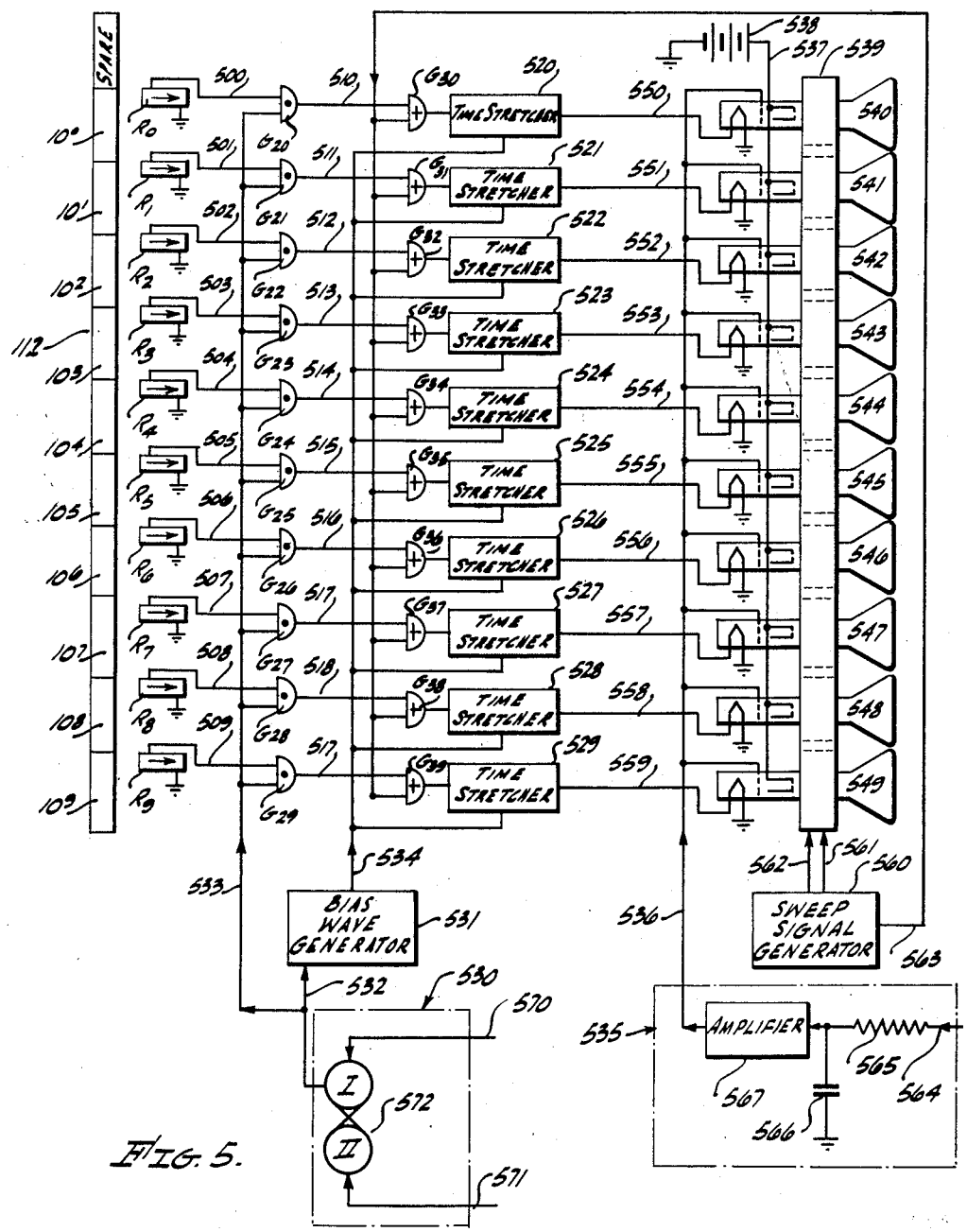
Fig. 5 is a block diagram of a display circuit for use with the machine of Fig. 2.

Fig. 5 shows the complete display unit in block diagram form. Ten reading heads, $R_0$ through $R_9$, are spaced uniformly, one decade apart, around the circumference of track 112 of drum 100. One of these heads, $R_0$, is shown in a possible relative position with respect to the R head in Fig. 2a, while heads R1 and R2 are shown in corresponding positions in Fig. 2c. The output signals of heads R0 through R9 are supplied to one of the inputs of "and" gates G20 through G29 by leads 500 through 509, respectively. The output terminals of gates G20 through G29 are connected to the input terminals of "or" gates G30 through G39 through leads 510 through 519, respectively. The output terminals of "or" gates G30 through G39 are connected to the input terminals of time stretchers 520 through 529, respectively.

A bias and read timer circuit 530, has its output terminal connected to the input terminal of a bias wave generator 531 through a lead 532. In addition, circuit 530 has its output terminal connected through lead 532 and a lead 533 to the other input terminal of each of gated G20 through G29. The output signal of generator 531 is supplied to the bias input terminals of time stretchers 520 through 529 through a lead 534. The output signals from time stretchers 520 through 529 are supplied to the cathodes of cathode ray tubes 540 through 549 through leads 550 through 559, respectively.

A video signal generator 535 has its output terminal connected, respectively, to the control grids of tubes 540 through 549 through a lead 536. The anodes of tubes 540 through 549 are all connected to a lead 537 which in turn is connected to the positive terminal of a source of direct-current potential, such as battery 538 having its negative side connected to ground. Battery 538 maintains all of the anodes at the same fixed positive voltage. The beams in all of the cathode ray tubes are swept through their patterns simultaneously by an external magnetic deflection yoke circuit 539. The sweep signals are supplied to yoke circuit 539 from a sweep signal generator 560 through a pair of leads 561 and 562. Generator 560 also supplies signals to time stretchers 520 through 529 through a lead 563, which is connected to the other input terminal of each of gates G30 through G39.

The circuits employed in the various units shown in Fig. 8 as block diagrams will be explained in detail below. The detailed operation of this system will be described after the various circuits are explained. However, in the most general terms, the operation of this system can be explained as follows. The signal from generator 560 causes the magnetic field produced by deflection yoke circuit 539 to vary in such a way that if a beam is sent out by a cathode ray tube it will trace out a uniform field pattern on the face of the tube, in the same general fashion as a television receiver tube. Generator 535 supplies a signal to the control grids of all cathode ray tubes such that, if the cathodes were at a negative voltage with respect to the control grid, the digits, 0, 1, 2, . . . 9, would be successively illuminated on the faces of the tubes. If the cathodes were continually at a negative voltage this would simply result in a blur on the face of the tube because of the rapidity with which the illuminated number would change from 0 to 1 to 2, etc. The output signals from time stretchers 520 through 529 supply negative bias to the cathodes of the cathode ray tubes for a limited time, however, such that during one revolution of drum 100 only one digit is illuminated on the face of each cathode ray tube. The time during the cycle at which this negative voltage is applied determines what digit appears on the cathode ray tube.

Since the various N signals in track 112 occur at different places according to what digit is represented, they cause signals in the heads R0 through R9 at different times, according to what digit is represented. It is the function of time stretchers 520 through 529, and the associated circuits, to take these timed pulses from heads R0 through R9 and to convert them into negative pulses to be applied to the cathode ray tubes, these pulses being of the correct duration to permit only one digit to be traced out, and occurring at the correct time to cause the appropriate digit to be traced out. Since drum 100 rotates at many revolutions per second, whatever number is traced out on the cathode ray tube at the rate of one per revolution will appear as a steady picture to the eye of the observer.

Figure 11:
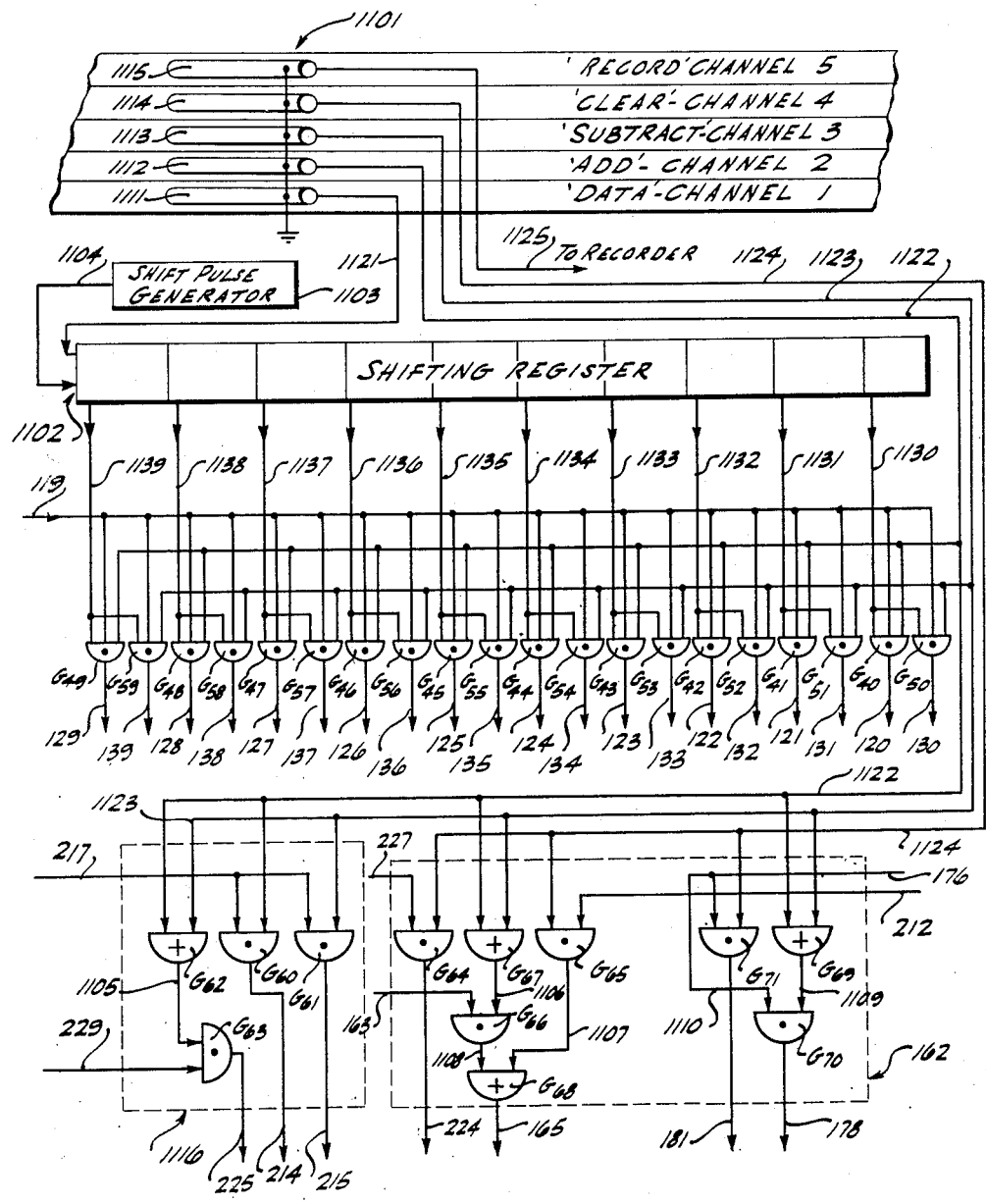
Fig. 11 is a schematic diagram of another embodiment of the switching circuit of Fig. 2.

Referring now to Fig. 6, there is shown a circuit diagram of one form of magnetic deflection yoke circuit 539 and sweep signal generator 560. Two additional tracks 280, 281 of drum 100, as shown in Figs. 2a and 2c are used to supply the synchronizing signals which actuate the sweep circuits of generator 560. Track 281 supplies the vertical synchronizing signal and track 280 the horizontal synchronizing signal. Tracks 280 and 281 include a series of uniformly spaced inserts 282, 283, respectively, of permanently magnetized material separated by small spaces of non-magnetic material. As shown, track 281 has many more smaller inserts than track 280. This results in a vertical sweep which is much more rapid than the horizontal sweep. The pattern resulting on the screen of any cathode ray tube is shown in Fig. 11.

Referring again to Figs. 2c and 6, a signal is induced in a reading head 284 by track 280 and supplied to a sawtooth wave generator, 601, by a lead 602. A head 285 supplies a signal from track 281 to a sawtooth wave generator 603 through a lead 604. Sawtooth wave generators 601, 603 are standard devices well known in the art, see e. g. Terman, "Radio Engineering," 3d edition, 1947, pp. 602–603. These circuits may be of a type similar to that used here as a bias wave generator, as described below.

The output of generator 603 provides the vertical sweep signal for magnetic yoke circuit 539 through lead 561. Two groups of ten leads are connected to lead 561 and form the vertical deflection coils by being wrapped around the horizontal legs of a yoke 605 of circuit 539. In Fig. 6, there are shown only leads 610, 611, 617, 618, 619 of the first group, and leads 620, 621, 627, 628 and 629 of the second group. A lead 606 is connected to ground, and one side of each of the vertical deflection coils is connected to lead 606.

The output of the generator 601 provides the horizontal sweep signal through lead 562. A similar group of leads, including leads 630, 631, 632, 638, 639 and 640, are connected to lead 562 and form the horizontal deflection coils by being wrapped around the vertical legs of yoke 605. The opposite side of each coil formed by leads 630, 631, 632, 638, 639 and 640 is connected to a ground bus 606. Lead 563 supplies the output of head 284 to the time stretchers and is connected to lead 602. The function of this signal will be explained in connection with the time stretchers circuit.

The operation of the system shown in Fig. 6 may be explained most simply by referring to only one section of yoke 605 and to the waveforms illustrated in Fig. 7. Lead 562 supplies the sweep signal from generator 601 and is connected to the upper ends of leads 638 and 639, which form the horizontal deflection coils. The lower ends of the coils are grounded to bus 606. Consider the instant when the voltage on lead 562 is positive with respect to ground. Current will flow from lead 562 through leads 638 and 639 to ground and will produce a magnetic field in the two vertical legs of yoke 605 as indicated by arrow 607 pointing upward in each leg. The fields resulting from the two coils oppose each other in yoke 605, but cause an external field between the upper and lower legs of the yoke which may be made essentially uniform over the cross-section of the cathode ray tube. This field is indicated by the dotted lines between the upper and lower legs. It is now seen that an electron in the beam of the cathode ray tube, which is travelling in a direction perpendicular to the plane of the paper in Fig. 6 would be deflected to the left or the right on passing through the magnetic field, the direction and amount of deflection depending on the direction and strength of the magnetic field. In Fig. 6, if the beam were travelling outward from the paper, the beam would be deflected to the right with the magnetic field in the direction shown. The vertical deflection coils produce a similar field between the vertical legs of yoke 605. The effects of the two sets of deflection coils may simply be added to obtain the total deflection.

Fig. 7 shows the pattern which must be traced on the face of the cathode ray tubes. The heavy lines indicate a relatively slow traverse and the light lines the much faster flyback. As indicated, there is one horizontal traverse to eleven vertical ones. This may be accomplished by making the period T of the horizontal sweep signal eleven times as long as the vertical sweep period. For example, if drum 100 is driven at 60 revolutions per second, and if track 280 has twenty-one inserts 282 and track 281 has 231 inserts 283, the waveforms will be as shown in Fig. 7 and the scope pattern as shown there. The output from head 284 will be a series of positive and negative pulses with the positive pulses occurring at a rate of 1260 per second, thus making the period $T = 1/1260$ seconds for the horizontal synchronizing signal. The duration of the positive pulse will determine the length of the flyback time as shown. Similarly the output of head 285 will be a series of pulses, as shown, for the vertical synchronizing signal, and will occur at eleven times the rate of the horizontal synchronizing signal pulses. In Fig. 7 these two pulse trains are not shown in the same scale. Thus, the vertical magnetic field in the various apertures in yoke 605 will, for horizontal deflection, slowly increase to a maximum and then quickly decrease to its initial value twenty-one times per drum revolution. The horizontal magnetic field for vertical deflection will go through a similar process 231 times per drum revolution. The beam will trace out the pattern shown in Fig. 7 on the face of the tube.

It is of course to be understood that the particular rates of scan here chosen are merely by way of example, as is the fact that the vertical sweep rate is chosen higher than that of the horizontal. To change the rates of sweep it is merely necessary to use a different number of inserts in tracks 280 and 281.

The next circuit in the system of Fig. 5 which will be described in detail is video signal generator 535, which supplies signals to the control grids of the various cathode ray tubes. This device is shown in Figs. 2a and 2c, and includes a head 286 and a track 287 having ten different variable density inserts, one of which is designated 288 in Fig. 2a, and one blank space 289 distributed uniformly around the circumference. The relationship of these inserts to the decades on track 112 is important. It will be recalled that track 112 has eleven decades, the numbered decades and one spare decade. Track 287 must be aligned such that blank space 289 of track 287, as shown in Fig. 2c, just reaches head 286 as the zero element of the units decade of track 112 comes opposite reading head $R_0$.

Head 286 generates a varying voltage output as the various inserts pass and this output voltage is supplied to the cathode ray tubes through lead 536 after passing through a lead 564, an integrating circuit, composed of a resistor 565 and a capacitor 566, and an amplifier 567, all as shown in Fig. 5. It is this voltage output that turns the beam of the cathode ray tube off and on at the proper times such that the digits, 0, 1, 2, . . . 9 may be illuminated on the screens of the tubes. The density of the first magnetic insert 288 of track 287 must vary in such a way that the digit 1 would be illuminated on all tubes having a negative cathode potential during the interval that insert 288 passes head 286. The density in the second insert 290 should vary to produce a 2, etc.

Fig. 3 shows the screen patterns required to produce the digits 1, 2, and 3 and the density variations in each of the first, second, and third inserts required to produce an output signal from head 286 to cause these patterns. In the case of the digit 1, the density pattern 801 is zero throughout the first three vertical sweeps of screen pattern 802, then about three-fourths of the way through the fourth sweep the density changes from zero to a positive value for a short distance and then drops to zero again abruptly. This causes a positive output voltage pulse from head 286 for a short time and then a negative pulse, as shown at 803 in Fig. 8. The positive pulse charges capacitor 566 to a positive voltage, and then capacitor 566 slowly discharges through resistor 565 until the negative pulse arrives. The negative pulse immediately changes the voltage on capacitor 566 back to zero where it remains until the next positive pulse arrives. Thus, the voltage output on lead 536 is almost an exact duplicate in voltage of the density variation in insert 288 of track 287.

It is thus seen that, to produce the digit 1 as shown, the beam must be turned on once during each of the fifth, sixth, and seventh sweeps. The screen patterns 805, 806 for the digits 2 and 3, respectively, are also illustrated in Fig. 8 and the required density variations 807, 808 illustrated below the respective screen patterns. The other digits may be constructed in an exactly analogous manner and the appropriate density variation plotted as for the digits 1, 2, and 3.

The video signal from generator 535 is supplied to all tubes simultaneously and causes a "potential" signal corresponding to the various digits, 0, 1, 2, . . . 9 to be impressed on the control grid of each tube. To cause one of the tubes to actually visibly produce a given digit on its screen, it is necessary to supply its cathode with a negative voltage during the time it takes for the insert of track 287 corresponding to the desired digit to pass head 286. The sources of this negative cathode voltage are time stretcher circuits 520 through 529. The method of providing this negative cathode voltage for the proper time interval and at the correct instant will now be explained.

Bias and read timer 530 is shown in Figs. 2c and 5. The only function of timer 530 is to provide a positive pulse, once per revolution of drum 100, having a duration equal to the time required for the numbered part of a decade on track 112 to pass any given point. In Fig. 2c, drum 100 includes an additional track 291 having a single magnetic insert 292 which is the same length as the numbered 0 to 9 part of a decade of track 112. A head 293 has a center tap to ground and opposite ends connected to leads 570 and 571, respectively. A flip-flop circuit 572, shown in Fig. 5, has its I and II state input terminals connected to leads 570 and 571, respectively. The I state output terminal of circuit 572 is connected to lead 532, there being no II state output. The position of insert 292 with respect to head 293 is related to the positions of heads $R_0$ through $R_9$ with respect to the decades of track 112. Insert 292 must just first reach head 293 as the zero element of the units decade of track 112 comes opposite head $R_0$. At this time the zero elements of the $10^1$ through $10^9$ decades will be arriving at heads $R_1$ through $R_9$, respectively.

The operation of timer 530 is as follows. When insert 292 first reaches head 293, a positive pulse is applied through lead 570 and a negative pulse through lead 571. The positive pulse flips circuit 572 to the I state which produces a positive signal on lead 532. This positive signal lasts until the trailing end of insert 292 reaches head 293. Then a positive pulse is applied through lead 571, flipping circuit 572 to the II state where it remains until insert 292 comes around again, one revolution later.

Time stretcher 529 may be a circuit of the type shown in Fig. 9. Referring to Fig. 9, input lead 510 from gate $G_{20}$ is connected through gate $G_{30}$ and a capacitor 901 to the grid of a vacuum tube 902. Bias for the grid of tube 902 is supplied by a battery 903 which has its positive side connected to ground and the cathode of tube 902, and its negative side connected to the grid of tube 902 through a resistor 904. An RC network, including a resistor 905 and a capacitor 906, is connected between the grid of tube 902 and the plate of a vacuum tube 907. Plate potentials for tubes 902 and 907 are supplied by a battery 908 through plate load resistors 909, 910, respectively. The plate of tube 907 is connected to output lead 550. The plate of tube 902 is connected through a capacitor 911 to the grid of tube 907, said grid being connected through a resistor 912 to the positive terminal of a battery 913. Battery 913 has its negative terminal connected to ground and the cathode of tube 907. The bias voltage provided by battery 913 is a positive bias about $\frac{1}{3}E_B$, where $E_B$ is the voltage of battery 908. Lead 534 from generator 531 is connected to the plate of diode 914, the cathode of diode 914 being connected to the grid of tube 907. This circuit is repeated identically in each of the other time stretchers 521 through 529.

The operation of the circuit of Fig. 9 is as follows. The normal and stable state of this circuit is that of tube 907 conducting and tube 902 cut off. In the absence of an input pulse from lead 510, the circuit will remain in this condition. The voltage on the plate of diode 914 is always negative, as explained below, hence no current is drawn by diode 914 in the stable condition of the circuit. Capacitor 911 isolates the grid of tube 907 from the plate supply voltage of tube 902. The values of resistors 904 and 905 are chosen so as to maintain the grid voltage of tube 902 sufficiently negative to retain tube 902 cut off.

In order to simplify the explanation of the operation of this circuit the waveforms of the various critical voltages are shown in Fig. 10. Referring to Fig. 10, the normal stable operation condition of the circuit of Fig. 9 is shown at time $t_0$. The voltage from plate to ground of tube 907, $e_{p1}$, is at some value, a fraction of $E_B$, since tube 907 is conducting. The grid voltage of tube 907, $e_{g1}$, is at a value near ground potential, where ground potential is designated 0 in Fig. 10, it being isolated from the plate of tube 902 by capacitor 911 and from generator 531 by diode 914. Resistor 912 has a large resistance and hence, when tube 907 is conducting, the grid current will cause a large voltage drop across resistor 912 so that the grid of tube 907 will operate at a much lower positive voltage than the voltage across battery 913.

The plate voltage of tube 902 $e_{p2}$, is at the full supply voltage $E_B$ since tube 902 is not conducting. The grid voltage of tube 902 $e_{g2}$, is maintained at a negative voltage of approximately the value of the voltage of battery 903.

Now, assume that at a time $t_1$, a positive pulse is applied through lead 510. This pulse will swing the grid of tube 902 positive, permitting tube 902 to conduct. Thus, $e_{g2}$ rises sharply, as indicated in Fig. 10, and $e_{p2}$ drops sharply nearly to zero. These voltages then assume their normal operating value, $e_{g2}$ at 0 and $e_{p2}$ at some fraction of $E_B$. The instantaneous change in the value of $e_{p2}$ of, say $\frac{2}{3}E_B$, is transmitted through capacitor 911 to the grid of tube 907, causing $e_{g1}$ to swing through the same voltage negatively.

Now assume that at $t_1$ the plate voltage of diode 914, from generator 531, is at, say $\frac{2}{3}E_B$. Since the grid voltage of tube 907, $e_{g1}$, is suddenly negative by an amount $\frac{2}{3}E_B$, current will flow through diode 914 until the voltage at the grid of tube 907 is equal to the bias wave generator voltage. This flow through diode 914 produces the spike of negative voltage in the curve of $e_{g1}$. Of course, if the plate voltage of diode 914 is at some other value, less negative for example, the voltage $e_{g1}$ will return immediately to that value.

The charge on capacitor 911 will leak off through resistor 912 and $e_{g1}$ will rise toward an asymptotic value equal to the voltage of battery 913, here assumed to be $+\frac{1}{3}E_B$. If tube 907 did not become conducting, this voltage would ultimately be reached. However, at some point $t_2$ the cutoff bias at which tube 907 just begins to conduct will be reached and $e_{g1}$ will rise sharply and then level off at its stable operating point value. The rate of rise of $e_{g1}$ is determined by the time constant of RC network 911, 912. The starting point of the rise is determined by the voltage delivered by generator 531 to the plate of diode 914.

When tube 907 starts to conduct again, its plate voltage, $e_{p1}$, swings sharply downward nearly to zero and then levels off at its original stable value. This voltage swing is transmitted to the grid of tube 902 through capacitor 906, causing a sharp cutoff of tube 902. $e_{g2}$ swings down to say $\frac{2}{3}E_B$ and then capacitor 906 discharges rapidly so that $e_{g2}$ again assumes its normal value. The circuit is now back in its initial stable state and will remain so until another pulse is applied through lead 510. It is seen that the output voltage, $e_{p1}$, is a normally positive voltage determined by the characteristics of tube 907, the value of resistor 910, and $E_B$, this voltage being a small fraction of $E_B$. Each time a pulse is received from head $R_0$, this voltage, $e_{p1}$, changes to a high positive value, $E_B$, and remains there during the discharge of capacitor 911. The remaining portions of the curves of Fig. 10 will be explained below in connection with the operation of the circuit of Fig. 5.

The only component of the display circuit of Fig. 5 which has not been described in detail is bias wave generator 531. The purpose of generator 531 is to utilize the pulse applied from timer 530 through lead 532 and produce an output signal of sawtooth waveform on lead 534. For satisfactory operation of time stretcher 520, as shown in Fig. 9, the sawtooth wave should vary between a maximum value equal to the cutoff bias of tube 907 and a minimum value equal to approximately twenty times the cutoff bias of tube 907.

As set forth above, generator 531 may be a sawtooth generator of the type used in generator 560 of Fig. 5. One circuit which is particularly suitable for generator 531 is that shown in Figs. 12–23 (b) of the above-cited "Radio Engineering" text. In this circuit, with the output signal taken across the cathode coupling resistor, the sawtooth output will be linear and may be adjusted to the desired values.

OPERATION

The overall operation of the display circuit may now be traced out quite easily. Refer again to Fig. 5. A complete cycle of operation starts when the 0 element of the units decade arrives at head $R_0$ and the 0 elements of the subsequent decades arrive at the appropriate other heads $R_1$ through $R_9$. At this instant, timer 530 produces a positive pulse which lasts until the 9 element of each decade has passed its corresponding head. This pulse is designated 1001 in Fig. 10. It is seen that the time scale in Fig. 10 is divided into eleven sections, one section corresponding to the time required for one decade of the track 112 to pass a given fixed point, such as head $R_0$.

Assume that the N signal in the units decade of track 112 is in the 6 element. Head $R_0$ will then transmit a pulse 1002 as shown in the second line of Fig. 10, after timer pulse 1001 has been on $\frac{7}{10}$ of its total duration. As the other decades pass head $R_0$, the N signal in each of these decades will produce a pulse in head $R_0$, as shown in Fig. 10. First, the tens decade will pass head $R_0$, then the $10^2$ decade, then $10^3$, etc. For the purposes of this discussion it is immaterial what particular numbers are in these other decades.

Gate $G_{20}$ will transmit a positive pulse only when positive signals appear on leads 533 and 500 simultaneously. Hence, the only pulse from head $R_0$ which actuates gate $G_{20}$ in pulse 1002. A pulse will then be applied through "or" gate $G_{30}$ to streacher 520. As seen in connection with Fig. 9, this pulse will arrive at the grid of tube 902 at time $t_1$ and cause tube 902 to start conducting.

The change in the plate voltage of tube 902 will cut off tube 907 and $e_{p1}$ will rise to the plate supply voltage at time $t_1$ in Fig. 15. Now the value of $e_{g1}$ is determined by the plate voltage of diode 914 in Fig. 9, and this diode voltage is the bias wave generator output 1003 shown in the third line of Fig. 10. As seen there, the value of this bias wave voltage decreases linearly with time during timer pulse 1001. Hence, the particular value which $e_{g1}$ will assume at time $t_1$ depends on the time at which this pulse arrives. When the N signal is in the 6 element, $e_{g1}$ will assume a value which is equal to the value of the bias wave voltage 1003 at a time $7/10$ of the way through its negative swing, as shown. If an N signal appeared in the 0 element, the bias voltage at $1/10$ of its total negative swing would determine $e_{g1}$, etc. The total voltage swing of bias wave 1003, as set forth above, is from the cutoff bias voltage of tube 907 to 20 times that value. Hence, the value of $e_{g1}$ when a pulse is received from a 0 element will be 2 times the cutoff bias. When a pulse is received from the 1 element, the value of $e_{g1}$ will be 4 times the cutoff bias, etc.

Voltage $e_{g1}$ rises approximately linearly as capacitor 911 discharges, and the rate of rise is constant, without regard to the initial value which is determined by bias wave voltage 1003. Tube 907 conducts again when $e_{g1}$ reaches the cutoff bias value, as explained in connection with Fig. 9. Thus, the length of time during which tube 907 is non-conducting is determined completely by the bias wave voltage which exists at the time the pulse from head $R_0$ is received. When, as in this example, the pulse is received from the 6 element, tube 907 remains non-conducting until the 0 element of the $10^7$ decade of the track 112 reaches head $R_0$.

If the N signal had been in the 1 element, for example, $e_{g1}$ would have followed a curve similar to the solid curve in Fig. 10, but starting at a bias wave voltage less negative, the cutoff bias of tube 907 would have been reached sooner, when the 0 element of the $10^2$ decade reached head $R_0$. This waveform is shown dotted in Fig. 10 and indicated by the numeral 1004. If the N signal has been in the 4 element, an intermediate curve would have resulted as shown dotted and indicated by the numeral 1005. Similarly, parallel $e_{g1}$ curves would result for each other digit, the time at which tube 907 became conducting, in each case, being different by the time of one decade of track 112. This variation is made possible by having a bias wave 1003 which fixes the initial value of the $e_{g1}$ curve at values which are multiples of the value which gives a correct starting time for the 0 video signal. Thus the initial value of $e_{g1}$ for the 1 signal is about twice the value of the voltage for the 0 signal and so the decay of $e_{g1}$ continues about twice as long before reaching the cutoff bias.

It should be noted at this point that there may be non-linearity in the bias wave, or for some other reason the various pulses from track 112 may cause $e_{g1}$ to reach cutoff bias at times which do not precisely correspond to the beginnings of the various decades of track 112. In this case, it is always possible to adjust the lengths of inserts in track 287 to conform to the times at which cutoffs actually occur. Thus, as a practical matter, the timing need not be as precise as indicated in Fig. 10.

The N signal in track 112, and hence pulse 1102, arrives at a time which distinguishes it from the other possible pulses representing the other digits, by an amount of time equal to one-tenth the duration of timer pulse 1101. As seen, the total time interval within which these pulses must arrive is the time it takes for the numbered elements of one decade of track 112 to pass head $R_0$. Hence, the difference in time of arrival between the pulses representative of different digits is one-tenth of this total interval.

For different digits, therefore, the interval during which the output of time stretcher 520 is positive, and hence cathode ray tube 540 is off, varies by at least an amount of time equal to the time required for an entire decade of track 112 to pass head $R_0$. More percisely, the time at which tube 540 turns off varies by a time equal to one decade's travel past head $R_0$. The time at which tube 540 turns on varies for the different digits by the same interval as the interval between the pulses from head $R_0$. It is because of this longer interval during which tube 540 is turned off, as compared with the time interval between the possible N signals in track 112, that the cathode ray tube control circuit is called a "time stretcher." The amount of "time stretching" may be defined as equal to the ratio of the time interval that a given video digit remains on to the time interval between possible times of arrival of the pulses from track 112. Here, where a video digit remains on for one decade of track 112 consisting of 21 segments and where the digit signals are separated by one segment, the amount of time stretching may be defined as equal to 21.

Thus far, it has been shown that the circuits described will cause tube 540 to be turned off by supplying a high positive voltage to the cathode of tube 540 until the video signal corresponding to the digit represented by the N signal in track 112 is ready to operate. At this time $t_2$ the voltage on the cathode of tube 540, will suddenly decrease to a low positive value and remain there while the appropriate video signal is applied to the control grid of tube 540. It is desired to have tube 540 on for only one video digit signal and then to have it turned off before the next video signal arrives. This may be accomplished by applying another positive pulse to time stretcher 520 after the appropriate video signal is completed.

An appropriate signal is available for this purpose in the sweep signal generator 560. This signal, designated 1006 in Fig. 10, is applied to the time stretchers through lead 563 and "or" gates $G_{30}$ through $G_{39}$. Gates $G_{30}$ through $G_{39}$ transmit a signal to the time stretchers whenever a signal is received on either input and serve to isolate the time stretcher inputs from each other.

Signal 1006 arrives while tube 907 is non-conducting and $e_{p1}$ is at a high positive value. Therefore, signal 1006 has no effect on the circuit, since the grid of tube 902 already is above cutoff and tube 902 is conducting. The signal 1007 which arrives just before or at the time $t_2$ when $e_{g1}$ reaches the cutoff bias value may serve to delay slightly the changeover of tube 902 from a non-conducting to a conducting state, but it insures a positive changeover. The next signal 1008 will arrive at the grid of tube 902 at time $t_3$ when tube 902 is in a non-conducting state and will cause tube 902 to conduct again just as did pulse 1002 received from head $R_0$. Time stretcher circuit 520 will again go through the same process as before, the voltage $e_{g1}$ starting at whatever value the bias wave has at this time. The waveform of $e_{g1}$ in Fig. 10 indicates this behavior by the second negative spike and the subsequent decay toward the cutoff bias which is reached at the end of the cycle. The rates of decay of bias wave 1003 and $e_{g1}$ are the same, so that when bias wave 1003 reaches the cutoff bias at the end of its cycle and starts down again, $e_{g1}$ will also reach this value and tube 907 will against conduct until the next pulse from track 112 arrives.

The video signal 1009 is shown in Fig. 10 to illustrate its relation to the other signals. As shown, no attempt has been made to faithfully reproduce the exact signals necessary for the various digits, since this is unimportant here. As shown, the signal remains at 0 voltage with respect to ground during the first decade while blank insert 289 of track 287 passes head 286 in Fig. 2c. Then, the various digit signals appear as positive pulses appropriate to reproduce the various digits, as explained in connection with Fig. 8.

Video signal 1009 is applied between the control grid and ground of tube 540 of Fig. 5. The output of time stretcher 520 is applied between cathode and ground of tube 540. The voltage between cathode and control grid determines whether or not a beam will reach the screen, and only when this voltage is positive can a beam exist. So long as $e_{p1}$ is at its high positive value, the cathode to anode voltage will be negative, as shown in Fig. 10, with the voltage nearer zero when the pulses from track 287 are produced. However, when the voltage $e_{p1}$ is at its low positive value during the passage of the 6 insert of track 287, the video pulses are sufficiently positive to cause the net cathode to control grid voltage to become positive. Only at these times will the screen of cathode ray tube 540 be illuminated.

A complete system for an electrical adding and subtracting machine has been described. In this system, provision was made for supplying input data by manual control of the keyboard buttons and for reading off the output data by means of a visual display system. For some purposes it may be desirable to supply the input data from a magnetic tape, a punched card, a paper tape, or other means in which the data has previously been installed, rather than performing each step manually. Similarly, it may be desired to record the output data on a tape or punched card for future reference, rather than to display the data visually, as has been described. In either case, the main calculating circuits which have been described may be used without alteration. Appropriate circuits for input and output systems which employ magnetic tape will be described now.

Fig. 11 is a schematic diagram of a data conversion circuit in which data is supplied from a magnetic tape rather than by manually operating switches, as in Fig. 2b. The circuit of Fig. 11 can act as a complete replacement for the circuit of Fig. 2b, which includes keyboard 117, switches 116 and 162 and gates $G_0$ through $G_9$. In other words, the circuit of Fig. 11 could be connected to tube 117, source 169, amplifier 160, circuit 173, and RC network 226, 228, all as set forth below, to form a modified arrangement of the portion of the machine shown in Fig. 2b.

Referring to Fig. 11, a magnetic tape 1101 on which input data is stored is shown passing under magnetic reading heads 1111 through 1115, which in turn are connected to leads 1121 through 1125, respectively. Lead 1121 supplies the output of head 1111 to a shifting register 1102, shown in detail in Fig. 12. A shift pulse generator 1103 supplies its output to shifting register 1102 through a lead 1104. Shifting register 1102 has ten output leads, 1130 through 1139 connected to the inputs of "and" gates $G_{40}$ through $G_{49}$ and of "and" gates $G_{50}$ through $G_{59}$, respectively.

Each of gates $G_{40}$ through $G_{59}$ has three input terminals and is operable upon simultaneous application of positive signals to all of its input terminals. Lead 119, shown in Fig. 2b, applies the output signal of gate $G_{10}$ to one other input terminal of each of gates $G_{40}$ through $G_{59}$. Lead 1122 is connected to the remaining input terminal of each of gates $G_{40}$ through $G_{49}$, while lead 1123 is connected to the remaining input terminal of each of gates $G_{50}$ through $G_{59}$.

The output leads 120 through 129 of gates $G_{40}$ through $G_{49}$, respectively, correspond to the "add" output leads of switch 116 of Fig. 2b. Similarly, output leads 130 through 139 of gates $G_{50}$ through $G_{59}$, respectively, correspond to the "subtract" output leads of switch 116. Accordingly, the same numerical designation is used in Figs. 2 and 11.

The other elements of the data conversion circuit of Fig. 2b are switch 162 and the portion of switch 116 associated with source 216 and network 226, 228. These elements are designated in Fig. 11 in the same manner as in Fig. 2, except that here the switching is done by means of "and" and "or" gates rather than by manually operable switches.

The remaining portion of switch 116, which is designated 1116 in Fig. 11, includes a pair of "and" gates $G_{60}$ and $G_{61}$, each of which has two input terminals. Lead 217, the output lead of source 216 in Fig. 2c, is connected to one input terminal of gate $G_{61}$, and to one input terminal of gate $G_{60}$. Lead 1122, the "add" input lead, is connected to the other input terminal of gate $G_{60}$, while the other input terminal of gate $G_{61}$ is connected to "subtract" input lead 1123. It is thus seen that gate $G_{60}$ corresponds to the "add" output terminal of switch 116 and has its output terminal connected to lead 214, while gate $G_{61}$ has its output terminal connected to lead 215.

Switch 1116 further includes an "or" gate $G_{62}$ having a pair of input terminals connected to leads 1122 and 1123, respectively. The output terminal of gate $G_{62}$ is connected through a lead 1105 to one input terminal of an "and" gate $G_{63}$. The other input terminal of gate $G_{63}$ is connected to lead 229, the output terminal of the RC network of Fig. 2b. It is thus seen that gates $G_{62}$ and $G_{63}$ correspond to the portion of switch 116 of Fig. 2 associated with the RC network, and that the output terminal of gate $G_{63}$ corresponds to the terminal of switch 116 connected to lead 225.

Switch 162 of Fig. 11 comprises an "and" gate $G_{64}$ having one input terminal connected to lead 1124 which is the "clear" signal input lead from channel 4. The other input terminal of gate $G_{64}$ is connected to lead 227, the output lead of RC network 226, 228, as shown in Fig. 2b. It is thus seen that gate $G_{64}$ corresponds to the upper portion of switch 162 of Fig. 2b, and that the output lead of gate $G_{64}$ corresponds to lead 224, the input lead for source 169.

In Fig. 11, switch 162 further comprises a pair of "and" gates $G_{65}$ and $G_{66}$, and a pair of "or" gates $G_{67}$ and $G_{68}$. Gate $G_{67}$ has its input terminals connected to leads 1122 and 1123, respectively, and its output terminal connected to one input terminal of gate $G_{66}$ through a lead 1106. The other input terminal of gate $G_{66}$ is connected to lead 163, the output lead of amplifier 160 in Fig. 2b. Gate $G_{65}$ has one input terminal connected to lead 1124, and the other input terminal connected to lead 212, the 1 signal output lead in Fig. 2c. The output terminal of gate $G_{65}$ is connected to one input terminal of gate $G_{68}$ through a lead 1107. The other input terminal of gate $G_{68}$ is connected to the output terminal of gate $G_{66}$ through a lead 1108.

In operation, if a "clear" signal appears on lead 1124, gates $G_{65}$ and $G_{68}$ will conduct the 1 signal appearing on lead 212 to the output terminal of gate $G_{68}$. Gate $G_{66}$ will not transmit any signal on lead 163, since no signal appears on lead 1106 at this point. On the other hand, during an "add" or "subtract" operation, gate $G_{67}$ will apply a signal to gate $G_{66}$, and gates $G_{66}$ and $G_{68}$ will transmit any signal from amplifier 160 to the output terminal of gate $G_{68}$. Gate $G_{65}$ will be ineffective in the absence of a "clear" signal. It is thus seen that gates $G_{65}$ through $G_{68}$ correspond to the middle portion of switch 162 of Fig. 2b, and that the output lead of gate $G_{68}$ corresponds to lead 165, the input lead to gate $G_{11}$ in Fig. 2d.

The remaining portion of switch 162 of Fig. 11 includes an "or" gate $G_{69}$, and a pair of "and" gates $G_{70}$ and $G_{71}$. Gate $G_{69}$ has a pair of input terminals connected to leads 1122 and 1123, respectively, and an output terminal connected to one input terminal of gate $G_{70}$ through a lead 1109. The other input terminal of gate $G_{70}$ is connected through a lead 1110 to lead 176, the I state output lead of circuit 173 in Fig. 2b. Gate $G_{71}$ has a pair of input terminals, one terminal being connected to lead 176 and the other to lead 1124.

In operation, upon application of a "clear" signal to lead 1124, gate G71 is operative to produce a signal on its output terminal whenever a signal is applied to gate G71 through lead 176. Accordingly, the output lead from gate G71 corresponds to lead 181 in Fig. 2b. Whenever a signal is applied to either of leads 1122 or 1123, gate G69 applies a signal to gate G70 through lead 1169. Thus, gate G70 is operative to apply signals from lead 176 to its output terminal. Therefore, the output lead from gate G70 corresponds to lead 178 in Fig. 2b.

The operation of the modified data conversion circuit is essentially the same as that of the corresponding circuit of Fig. 2b, except that the input data is in the form of electrical signals rather than closed or open contacts. Tape 1101 has five channels in which data is stored, much the same as a punched card. The numbers to be added or subtracted are stored in channel 1 under head 1111 in precisely the same manner as data is stored in track 112 of Fig. 2. Decades of the same capacity as contemplated in track 112 are used, and the relative timing of signals should occur at the same rate as the timing in track 112. Thus, if zero appears in two adjacent decades in track 112 and in tape 1101, the time between impulses in head 1111 and in the R head in Fig. 2 must be the same.

The decades in tape 1101 must be shifted forward in time as a whole, compared with the decades in track 112. A convenient amount is the length of the lettered part of a decade of track 112. Thus when the 0 element of the units decade in tape 1101 arrives at head 1111 the A element of the last decade of track 112 arrives at the R head. When the 0 element of the units decade of track 112 arrives at the R head, the B element of the units decade in tape 1101 arrives at head 1111. Digits to be added or subtracted are stored in tape 1101 in the numbered parts of the decades of channel 1 and the lettered parts need not be used. When an N signal in tape 1101 reaches head 1111, a pulse is applied through lead 1121 to shifting register 1102. Register 1102 is also simultaneously receiving pulses from shift pulse generator 1103. In order to adequately explain the operation of register 1102, it will be necessary to consider the circuit diagram shown in Fig. 12.

Figure 12:
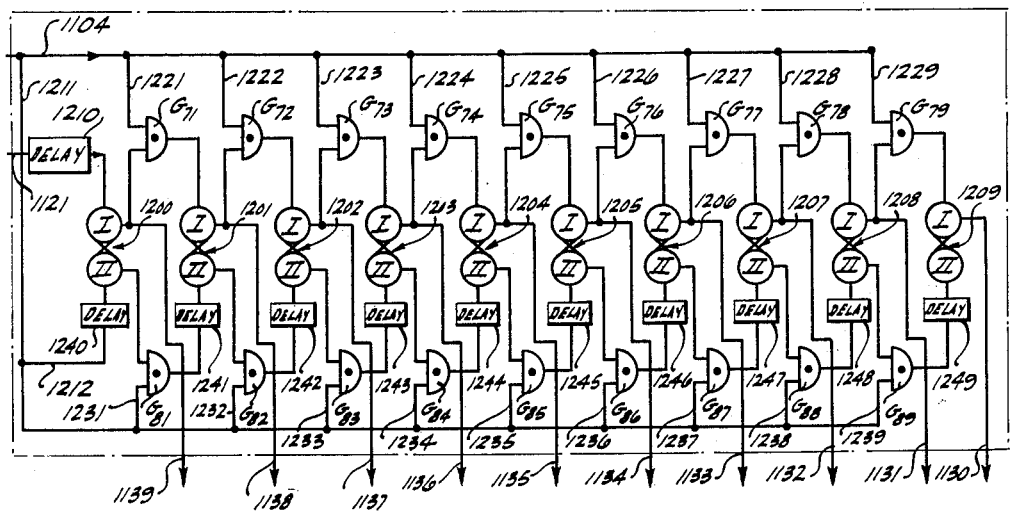
Fig. 12 is a block diagram of one form of shifting register for use in the circuit of Fig. 11.

Referring to Fig. 12 which is a schematic diagram of one form of shifting register 1102, leads 1121 and 1104 are shown entering at the left. Lead 1121 is connected to the I state input terminal of a flip-flop circuit 1200 through a delay circuit 1210 which has a delay equal to the time required for one element on track 112 to pass a fixed point. Lead 1104 is connected to leads 1221 through 1229 which are in turn connected to the input terminals of "and" gates G71 through G79, respectively. Lead 1104 is also connected to a lead 1211 which is connected to "and" gates G81 through G89 through leads 1231 through 1239, respectively. Lead 1211 is also connected through a lead 1212 and a delay circuit 1240 to the II state input terminal of circuit 1200. Delay circuits 1240 through 1249 are electrical delay circuits having a delay equal to the time required for one-half element of track 112 or of tape 1101 to pass a fixed point. This amount of delay is not critical as long as it is less than the delay introduced by circuit 1210.

The II state output terminals of flip-flop circuits 1200 through 1208 are connected to the input terminals of gates G81 through G89, respectively. The output terminals of gates G81 through G89 are connected through delay circuits 1241 through 1249, respectively, to the II state input terminals of circuits 1201 through 1209, respectively. The I state output terminals of circuits 1200 through 1208 are connected to the input terminals of gates G71 through G79, respectively. The output terminals of gates G71 through G79 are connected to the I state input terminals of circuits 1201 through 1209, respectively. The I state output terminals of circuits 1200 through 1209 are the output terminals of register 1102, and the leads from these terminals are designated in the same manner as in Fig. 11.

Figure 13:
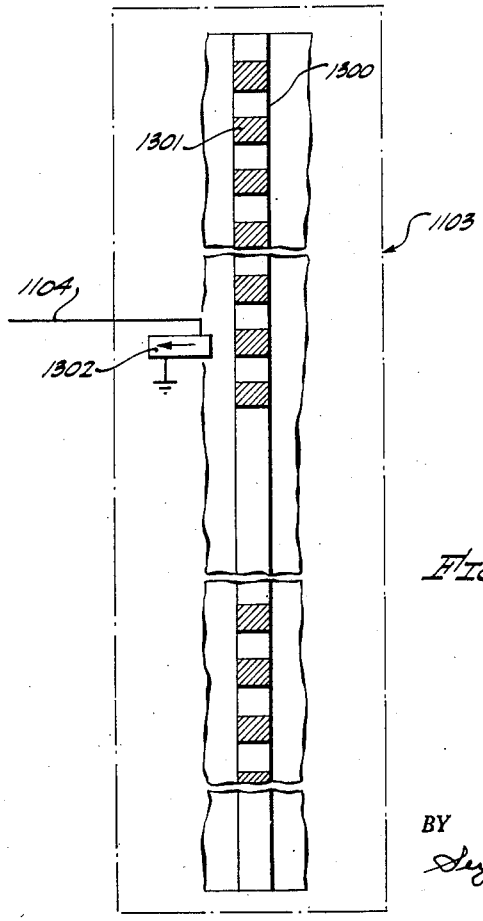
Fig. 13 is a schematic diagram of one form of shift pulse generator for use in the circuit of Fig. 11.
Figure 75:
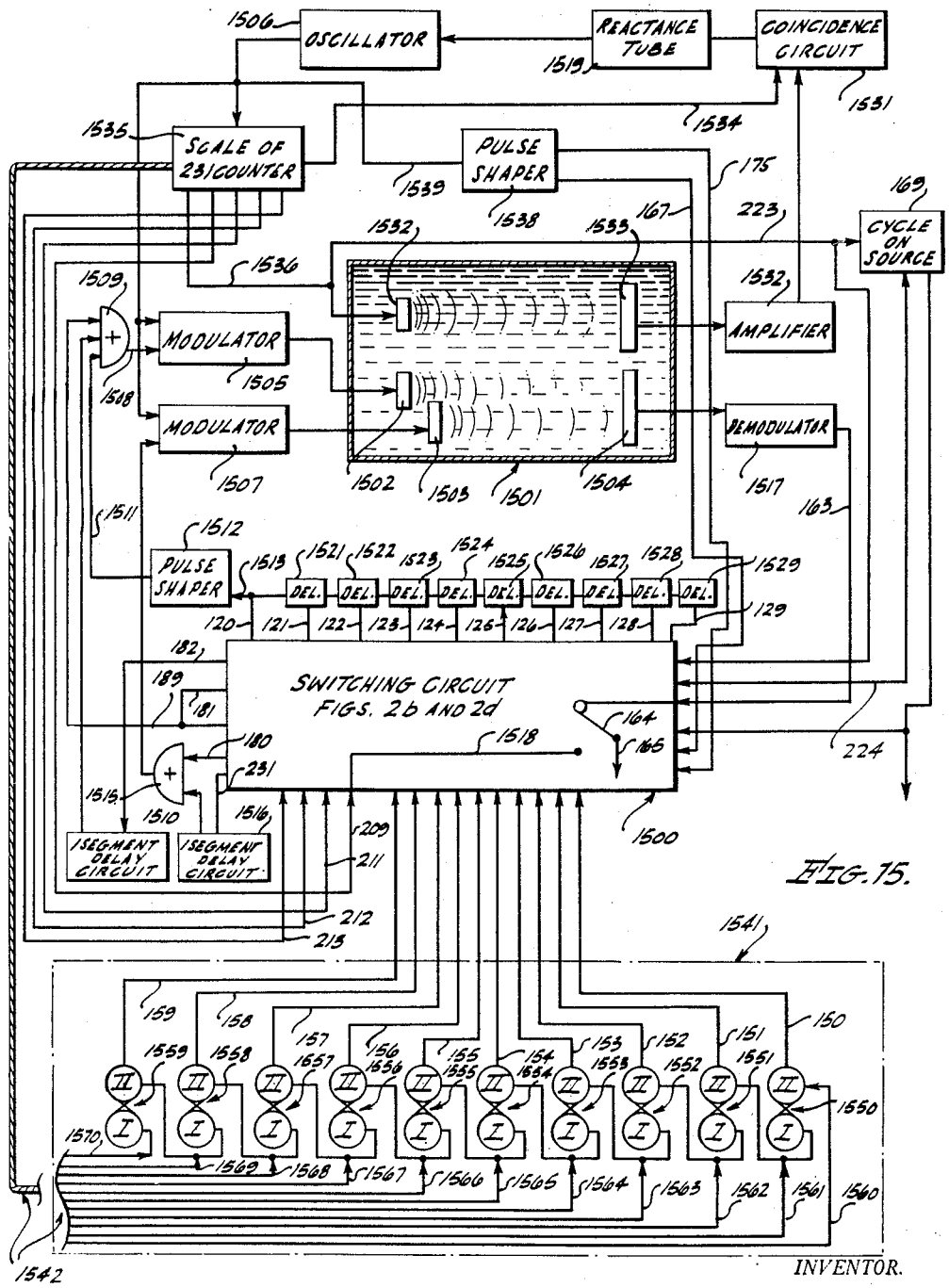

Fig. 13 is a schematic diagram of one form of shift pulse generator 1103. A track 1300 is shown in developed form and has a series of magnetic inserts 1301 therein. Inserts 1301 are arranged in 11 groups of 10 inserts each around the circumference of track 1301, adjacent inserts having the same identical spacing as the elements of track 112, each insert 1301 being of the same length as an element in track 112. The spacing between the groups of elements in track 1300 corresponds exactly to the lettered segments of the decades in track 112. In actual parctice, track 1300 would form a part of drum 100 of Fig. 2 in the complete system. However, since the circuit of Fig. 11 is separate and distinct from the corresponding component of the circuit of Fig. 2b, track 1300 is illustrated separately.

A head 1302 is mounted adjacent track 1300 and is connected to lead 1104 which is the input lead to register 1102, as shown in Fig. 11. The orientation of track 1300 with respect to track 112 is such that, when the A element of the spare decade of track 112 arrives at the R head, the first insert in one group of inserts 1301 arrives at head 1302. Thus the signals from head 1302 on lead 1104 are exactly synchronized with the signals in tape 1101. When the 0 element of the units decade in tape 1101 arrives at head 1111, the first element in one group of inserts 1301 arrives at head 1302.

Fig. 14 shows certain of the waveforms appearing in the circuit of Fig. 12. The first line shows the output of generator 1103 as it appears on lead 1104. Line two shows two examples of signals which might appear at the I state input terminal of circuit 1200 from lead 1121 after delay by circuit 1210. The first signal 1401 represents a 5 and the second signal 1402 represents a 9 digit. As seen by the dashed vertical lines 1403 and 1404, the positive pulse signal 1401 is aligned with the negative pulse between the sixth and seventh signals from generator 1103. The 9 signal 1402 in line two occurs just after the positive pulse of the tenth signal in the second group of signals from generator 1103.

Now, consider the operation of register 1102 when these input signals appear. Assume that, to begin with, all of the flip-flop circuits are in the II state. The first shift pulse 1405 will be applied to one of the input terminals of each of gates G71 through G79 and G81 through G89. Under these conditions, gates G81 through G89 will transmit signals through delay circuits 1241 through 1249, respectively, because each of these gates has signals applied to both inputs. The signals transmitted through the delay circuits will arrive at the inputs of circuits 1201 through 1209 at the same time the signal travelling through delay circuit 1240 arrives at circuit 1200, which is one-half element after the signals passed through the gates. Thus all ten circuits remain in the II state.

This process is repeated as each of the next five pulses from generator 1103 is received. Then, pulse 1401 from delay circuit 1210 arrives at the I state input of circuit 1200, flipping circuit 1200 to the I state. When circuit 1200 is in the I state, a signal 1406 will be transmitted through lead 1139 as shown in line three of Fig. 14, the leading edge of signal 1406 being aligned with the positive peak of signal 1401 as indicated by dashed line 1407. Then the seventh shift pulse 1408 is applied to the inputs of all "and" gates. Since all the flip-flop circuits, except circuit 1200, are in the II state, gates G82 through G89 will transmit shift pulse 1408. However, gate G71 rather than gate G81 will transmit pulse 1408, since circuit 1200 is in the I state. Hence, circuit 1201 will flip to the I state and a signal will appear on lead 1138. One-half element later all the other flip-flop circuits will receive shift pulse 1408. The only circuit not already in the II state is circuit 1200, and this circuit will be flipped, thus cutting off signal 1406 on lead 1139, as shown in line three of Fig. 14. The eighth shift pulse arrives next, travelling through gates G72, G81 and G83 through G89. The signal at the output terminal of gate G72 flips circuit 1202 to the I state where it remains until the ninth shift pulse arrives. During this time a signal will appear on lead 1137. The ninth shift pulse will travel through gate G73 and flip circuit 1203 to the I state. The tenth pulse will flip circuit 1204 to the I state and all other flip-flop circuits to the II state.

Circuit 1102 will remain in this condition during the time between shift pulses, which correspond to the length of the lettered part of a decade of track 112. During this interval, a signal 1409 will be applied through lead 1135, as shown on the fourth line in Fig. 14. This is the interval during which signals from the R head are transmitted to the circuit of Fig. 11, since the numbered elements of a decade of track 112 start passing the R head one segment after the signal just appears on lead 1135.

The operation of shifting register 1102 during the second decade shown in Fig. 14 will be as follows. As the first five successive shift pulses are received the signal appearing on lead 1135 will be shifted to lead 1134, 1133, 1132, 1131, and finally to 1130 as the fifth pulse is received, the mechanism being the same as explained above. The sixth shift pulse will flip circuit 1209 to the II state and then all flip-flops will be in this position. No further action will occur until the data input pulse 1402, which in this case represents the digit 9, is received at circuit 1200, at which time circuit 1200 will flip to the I state and a signal 1410 will appear on lead 1139. Circuit 1102 will remain in this condition until the next group of shift pulses arrives, as shown in line three of Fig. 14. The fifth line of Fig. 14 shows the 0 decade pulse as a reference.

The operation of shifting register 1102 may now be summarized as follows. An input data pulse on lead 1121 will cause the first flip-flop circuit 1200 to transmit an output signal on lead 1139. Shift pulses transfer the output signal successively to leads 1138, 1137, . . . 1130. Circuit 1102 will transmit an output signal on one of the ten output leads when the 0 element of each decade of track 112 arrives at the R head. The particular output lead on which a signal appears is determined solely by the time at which the data input pulse arrived. If the pulse arrived between the first and second shift pulses, an output signal will appear on lead 1130. If it arrived between the second and third shift pulses, an output signal will appear on lead 1131, etc. This output signal will remain on this lead until the first shift pulse of the next group of ten occurs, i. e., until the 9 element of the specified decade on track 112 has passed the R head.

Referring again to Fig. 11, it has been seen that data input pulses from head 1111 will cause an output signal on one of the leads 1130 through 1139 during the entire time that the R head is passing the numbered elements of a decade. It has also been seen that, if the signals in tape 1101 are arranged in the same manner as signals in track 112, an N signal in the 0 element of a decade in tape 1101 will cause a signal to appear on lead 1130, an N signal in the 1 element will cause a signal on lead 1131, and so forth.

Referring again to Fig. 2, if the R head encounters an N signal, say in the 0 element of a given decade, it transmits a signal through the circuit of Fig. 2 to lead 119, also shown in Fig. 11. This signal will be applied to each of gates G40 through G59. Only two of these gates will simultaneously receive a signal from shifting register 1102. For example, assume that an output signal appears on lead 1135. Then only gates G45 and G55 will be capable of transmitting a signal. Which of these gates will conduct depends on whether a signal appears on lead 1122 or on lead 1123, and this in turn depends on whether a signal is being transmitted from head 1112 or head 1113.

If it is desired to perform addition, gate G45 should conduct and apply a signal directly to head N5 through lead 125. If it is desired to subtract, gate G55 should conduct and apply a signal on lead 124 to head N4. Thus head 1112 must transmit a signal during addition and head 1113 during subtraction. To accomplish this result, it is simply necessary to install a signal in channel 2 of tape 1101 under head 1112 which increases linearly during a cycle when it is desired to add. A similar signal may be installed in channel 3 under head 1113 to cause subtraction. These signals are exact replacements for the pushing of the "add" and "subtract" buttons in Fig. 2. Thus, if addition is being performed, an "add" signal appears on lead 1122 during the entire cycle and, if subtraction is being performed, a "subtract" signal appears on lead 1123.

These signals have the same wave shape as the cycle-on signal, and as an alternative to installing a linearly increasing signal in tape 1101, a single pulse at the beginning of a cycle could be used to actuate cycle-on source 169 of Fig. 2, and then supply its output to leads 1122 and 1123, as desired.

The remainder of the circuit of Fig. 11 comprises head 1115, the "record control" head, and lead 1125. Channel 5 of tape 1101 is supplied with a linearly increasing signal whenever it is desired to record an answer, at the end of a complete addition or subtraction problem. This signal produces an output signal on lead 1125 equivalent to the cycle-on signal and is used to control the recording device in the output circuit. Of course, if the output circuit is a display circuit of the type shown in Fig. 5, no "record" control is required. However, ordinarily if data is supplied on magnetic tape, as in the circuit of Fig. 11, it will be desired to remove data by a similar process.

The circuit of Fig. 11 was shown with a magnetic tape as the source of input data, but this is not essential to the operation of the main part of the circuit. Signals can be supplied to leads 1121 through 1124 in the same timing by other means, such as punched cards which permit electric contacts to be made through holes in the cards. If a card were moved through a series of brushes at the proper speed, signals could be made to appear which would satisfy the requirements of the circuit. Similarly, if holes were punched in a paper tape, it could be used in place of the card.

ACOUSTIC DELAY LINE SYSTEM

The transfer method of performing mathematical operations, according to this invention, is not limited to systems employing magnetic signal receiving and apply devices. An entirely equivalent system utilizing an acoustic delay line is shown in Fig. 15. In Fig. 15, the switching circuit shown in Figs. 2b and 2d is bodily incorporated into the delay line system and is designated generally as 1500. The connections to and from circuit 1500 are designated with the same reference characters as the corresponding connections in Fig. 2.

Referring now to Fig. 15, the signal receiving means comprises an acoustic delay line 1501 which preferably includes a column of mercury in a suitable container, such as stainless steel tubing. Mercury is preferred as the receiving medium because of its relatively low acoustic velocity and its ability to transmit only one mode of vibration, that is compressional waves. In addition because of its high acoustic impedance and its low attenuation per unit length, mercury will operate satisfactorily as the transmission medium at relatively high frequencies.

Positioned in delay line 1501 are a plurality of transducers, 1502 through 1504, each transducer being preferably a quartz crystal which very closely matches the impedance of the mercury. Transducers 1502 and 1503 constitute the input transducers, while transducer 1504 is the output transducer. Each of transducers 1502 and 1503 converts electrical signals into mechanical motion and sets up waves in the mercury. After a delay determined by the length of delay line 1501, the waves reach transducer 1504 which reconverts the waves into electrical signals.

The spacing between transducers 1502 and 1504 determines the length of time required for one signal to travel across delay line 1501, and, therefore, the number of signals or pulses that may be stored in delay line 1501. Stated differently, at any given temperature, the length of delay line 1501 should be equal to the product of the number of pulses to be stored and the pulse spacing. Thus, for a delay line equivalent to track 112 of Fig. 2, the spacing between transducers 1502 and 1504 should be equal to 462 times the length of each element, since there are 231 elements and the spacing between the leading edges of adjacent elements is twice the length of one element.

In utilizing delay line 1501 as a part of a calculating device, it is preferable to actuate transducers 1502 and 1503 with a high frequency carrier wave signal modulated by a pulse representing the digit. Accordingly, the input terminal of transducer 1502 is coupled to the output terminal of a modulator 1505 which receives carrier wave energy from an oscillator 1506. The output of oscillator 1506 also is applied to the input terminal of a modulator 1507 which has its output terminal coupled to the input terminal of transducer 1503. The length of the spacing between transducers 1502 and 1503 is equal to the length of ten segments of a decade of track 112, that is equal twenty times the length of each element. The purpose of this spacing is set forth below.

The modulation signal input terminal of modulator 1505 is coupled through a lead 1508 to the output terminal of an "or" gate 1509. Gate 1509 has three input terminals, one of which is connected to lead 189, the output lead from gate G14, as shown in Fig. 2d, and to lead 181, the "clear" signal output terminal. Another input terminal of gate 1509 is connected to lead 182, the output lead from gate G15 of Fig. 2d, through a delay circuit 1510. Delay circuit 1510 introduces a time delay equal to the time required for a signal to travel one segment of space in delay line 1501. The third input terminal of gate 1509 is connected through a lead 1511 to the output terminal of a pulse shaper 1512 which serves merely to sharpen the pulses applied to its input terminal.

The input terminal of pulse shaper 1512 is connected through a lead 1513 to lead 120, the output lead of switch 116, as shown in Fig. 2b. Output leads 121 through 129 of switch 116 are connected to the input terminals, respectively, of a plurality of delay circuits 1521 through 1529, each of which introduces a time delay equal to the time delay of delay circuit 1510. Delay circuits 1521 through 1529 are serially connected, as shown in Fig. 15.

The modulation signal input terminal of modulator 1507 is connected through a lead 1514 to the output terminal of an "or" gate 1515 which has a pair of input terminals. One input terminal of gate 1515 is connected to lead 180, the output lead from gate G12 of Fig. 2d. Gate 1515 has its other input terminal connected through a one segment delay circuit 1516 to lead 231, the output lead from gate G13 of Fig. 2d. The output terminal of transducer 1504 is coupled to the input terminal of a demodulator 1517 which is coupled to circuit 1500 through a lead corresponding to signal input lead 163 of Fig. 2b.

Before proceeding with a description of the remainder of the components shown in Fig. 15, a brief description of the operation of the circuit thus far described will be given. Oscillator 1506 is assumed to be continuously running and to be applying carrier wave signals to modulators 1505 and 1507. However, in the absence of any modulation signal, demodulator 1517 produces no output signal.

When it is desired to begin a computation on the device shown in Fig. 15, the "clear" button is depressed. It should be noted that one change has been made in the switching circuit of Fig. 2b, namely, that 0 pulse output lead 209 is now connected through a lead 1518 to "clear" switch 162, instead of lead 212, as shown in Fig. 15.

Accordingly, a signal will appear at lead 181 at the point in time in each decade corresponding to the 0 element. These signals will be applied through gate 1509 to modulator 1505 which thereby applies the 0 signals in each decade, as in the operation of the magnetic machine.

The next operation is to insert the digits of one of the numbers into keyboard 117 and press the "add" button. In this manner, each 0 signal is received by transducer 1504, demodulated by demodulator 1517, and applied through lead 163 and keyboard 117 to one of leads 120 through 129, depending on the depressed button in keyboard 117. Thus the signal will be delayed and then applied to lead 1513, the delay corresponding to the magnitude of the digit. Each delayed signal is applied through shaper 1512 to gate 1509 and modulator 1505. The delayed signals are then applied to delay line 1501. This step corresponds to the first step in the operation of the magnetic machine, and delay circuits 1521 through 1529 correspond to heads N1 through N9.

It should be noted that no additional delay, corresponding to the two segment delay of the magnetic device, is utilized in the acoustic delay line device. The elimination of this additional delay is feasible, since there is no overlapping of heads as in the magnetic device. However, if desired, such a delay may be introduced by incorporating a two-segment delay circuit between leads 120 and 1513.

Since the additional delay has been eliminated in the acoustic delay line device, there is no necessity to remove and reapply the signals representing the digits of the first number. However, in order to utilize the circuit of Fig. 2, this step is performed. Thus, the signals are removed and reapplied through lead 189 and gate 1509. This step is equivalent to the transfer step through head T2 in the magnetic device.

The next step is to remove and displacedly reapply the signals by inserting the digits of the second number in keyboard 117 and again depressing the "add" button. In Fig. 15, this step is accomplished by delaying each signal the appropriate amount, and applying the delayed signal through pulse shaper 1512 and gate 1509. Again, the delay is determined by delay circuits 1521 through 1529.

The final step, as in the magnetic machine, is removal of each of the delayed signals and displaced reapplication thereof in accordance with the presence of a carry in the present or previous operation. If no carry was produced in either operation, the signals are reapplied through lead 189, as in the magnetic machine. If a carry was produced in the previous operation, the signal of the present operation is applied through lead 182 and delay circuit 1510. Since circuit 2210 introduces a one segment delay, reapplication through lead 182 corresponds to reapplication through head T1 in the magnetic machine.

When a carry is produced by the present operation, transducer 1503 is utilized in order to advance the reapplied signal in its decade. It should be remembered that transducer 1503 is spaced ten segments ahead of transducer 1502. Accordingly, reapplication directly through transducer 1503 corresponds to reapplication through lead 180 and head T12 of the magnetic machine. In other words, gate 1515 and modulator 1507 of Fig. 15 are utilized when a carry is produced in the present addition, while delay circuit 1516, gate 1515, and modulator 1507 are utilized when a carry is produced in both the present and previous addition operation.

It is thus seen that the machine shown in Fig. 15 performs the same method as the magnetic machine in the addition operation. Similarly, in subtraction operation, the machine of Fig. 15 performs the same steps as outlined above in connection with the magnetic machine. It should be noted, however, that the pulse output of the decade pulse generator utilized in the machine of Fig. 15 must be different from that used in the magnetic machine. This results from the elimination of the two element additional delay in the machine of Fig. 15. Thus, although leads 209 and 212 receive the 0 and 1 pulses, respectively, as in Fig. 2, leads 211 and 213 should receive the 9 and A pulses, respectively. Stated differently, the controlling point in each decade of the delay line is the 9 element, as distinguished from the B element in the magnetic drum.

In addition, it should be remembered that the various pulse sources, utilized in Fig. 2 to energize the switching circuit, were produced by tracks in magnetic drum 100. Obviously, where a delay line is utilized as the signal receiving means, it is impractical to generate pulses by a magnetic drum. Finally, when an acoustic delay line is utilized for the signal receiving means, it becomes desirable to provide a synchronizing circuit for oscillator 1506, in order to assure that the frequency of the pulses is maintained at the proper value with respect to temperature variations in delay line 1501. In Fig. 15 the synchronizing circuit for oscillator 1506 is also utilized as the control circuit for the various pulse sources of Fig. 2.

Referring again to Fig. 15, oscillator 1506 is tuned by a reactance tube 1519 whose control voltage is obtained from the output terminal of a coincidence circuit 1531. Circuit 1531 has two input terminals, one being connected through an amplifier 1532 to the output terminal of an auxiliary output transducer 1533. The other input terminal of circuit 1531 is connected through a lead 1534 to the output terminal of a counter 1535. Circuit 1531 may be any conventional circuit for producing an output pulse whenever the pulses on its input terminals coincide in time. Thus, circuit 1531 may be an "and" gate of the type previously mentioned.

Since it is desired to store 231 elements in delay line 1501, counter 1535 is a scale-of-231 counter which has its input terminal connected to the output terminal of oscillator 1506. Counter 1535 counts the signals from oscillator 1506 and produces an output signal on lead 1534 at the instant each 231st signal from oscillator 1506 is counted. Scaling circuits are well known in the art and require no detailed description. Reference is made to chapter 17 of volume 19 of the M. I. T. Radiation Laboratory Series, entitled "Waveforms," and published in 1949 by McGraw Hill Book Company, Inc., for circuit diagrams and descriptions of the basic components of scaling circuits.

The first signal of each series of 231 signals counted by counter 1535 is applied through a lead 1536 to an auxiliary input transducer 1537 which is aligned with transducer 1533 along an auxiliary path in delay line 1501. Accordingly, when the signal applied to transducer 1537 passes through delay line 1501 and reaches circuit 1531, the output signal of counter 1535 should reach circuit 1531 through lead 1534, if oscillator 1506 is tuned properly. Any variations in this coincidence will vary the control voltage applied by circuit 1531 to reactance tube 1519, and thereby vary the tuning of oscillator 1506 until coincidence is attained. In this manner, the cycle of operation of delay line 1501 may be accurately controlled to permit the 231 elements to be stored in each cycle.

Referring again to Fig. 2, it will be recalled that cycle-on pulse source 216 is required to produce a positive pulse at the beginning of each cycle of operation. It is apparent that the signal applied through lead 1536 is the first pulse or signal of each cycle of operation of delay line 1501. Accordingly, the lead connected between lead 1536 and cycle-on source 169 in Fig. 15 corresponds to lead 223 of Fig. 2b. Cycle-on source 169 of Fig. 15 may be identical with that disclosed in Fig. 2b, having its other input lead 224 connected to switching circuit 1500.

Clock pulse source 168 of Fig. 2 was required to produce a positive pulse for each element of the decades and a negative pulse for each space between the elements. Accordingly, a pulse shaper 1538, having its input terminal coupled through a lead 1539 to the output terminal of oscillator 1506, may be used for source 168 in the circuit of Fig. 15. Pulse shaper 1538 is designed to produce positive and negative pulses on its output terminals, respectively, for the positive and negative portions of each cycle of oscillator 1506. Therefore, the leads connected between pulse shaper 1538 and circuit 1500 correspond to leads 167 and 175 of Fig. 2.

As set forth above, the decade pulse generator utilized in the device of Fig. 15 is required to produce four positive pulses during each decade of the cycle of operation of delay line 2201. These pulses are the 0, 1, 9, and A pulses, that is, pulses corresponding in time to the 0, 1, 9 and A elements, respectively, of each decade. Now it can be seen that counter 1535 may readily be utilized for the decade pulse generator. Thus, by joining the output leads of the first, twenty-second, forty-third, etc. counting circuits of counter 1535, and applying the signal appearing on this common terminal to circuit 1500, the 0 pulse may be obtained. Similarly, the 1, 9, and A pulses may be obtained from the second, tenth, and eleventh counting circuits, respectively, of each group of twenty-one circuits of counter 1535. The leads connected between the various common terminals of counter 1535 and switching circuit 1500 are designated 209, 211, 212, and 213, as in Fig. 2d.

The remaining component of Fig. 15 is the decade commutator, generally designated 1541. It should be noted that the output leads of the decade commutators are designated alike in Figs. 2 and 22.

Decade commutator 1541 comprises a plurality of flip-flop circuits 1550 through 1559 having their II state output terminals connected to leads 150 through 159, respectively. A plurality of leads 1560 through 1569 are connected to the II state input terminals of circuits 1550 through 1559, respectively. Leads 1561 through 1569 are also connected to the I state input terminals of circuits 1550 through 1558, respectively. A lead 1570 is connected to the I state input terminal of circuit 1559. Leads 1560 through 1570 are connected, respectively, to the first, twenty-second, forty-third, . . . and 211th pulse counting circuits of counter 1535. For purposes of clarity, this connection between commutator 1541 and counter 1535 is shown as a single cable, designated 1542 in Fig. 15.

In operation, assuming all of circuits 1550 through 1559 to be in the I state at the start of a cycle of delay line 1501, the first pulse of the first decade is applied through lead 1560 to the II state input terminal of circuit 1550 and flips circuit 1550 to the II state. Circuit 1550 remains in the II state until the first pulse of the second decade, that is the twenty-second pulse of the cycle, is applied through lead 1561. The pulse on lead 1561 will flip circuit 1550 back to the I state, and flip circuit 1551 to the II state. Accordingly, a positive gate of twenty-one segment duration will appear on lead 150, the gate beginning with the 0 element of the units decade and ending with the 0 element of the tens decade. Similarly, circuits 1551 through 1559 will be actuated in sequence to produce the subsequent gates. Since the last pulse applied to commutator 1541 is the 211th pulse, no gate will appear during the eleventh or spare decade of the cycle of delay line 1501. Thus, commutator 1541 of Fig. 22 is the equivalent of commutator 118 of Fig. 2.

From the above description, it can readily be seen that the acoustic delay line machine may utilize the automatic circuit shown in Fig. 11 in place of the circuit of Fig. 2. Furthermore, any of the recording devices shown in the drawings may be utilized with the acoustic delay line machine. Still further, where it is desired to use only a single input transducer, a plurality of fixed delay circuits may be utilized. One suitable arrangement utilizing fixed delays and a single input transducer and modulator is shown in Fig. 16. It should be understood, of course, that the circuit shown in Fig. 16 is merely illustrative of the changes that can be made in the circuits of the present invention, and is not intended as a limitation on the scope of the invention, as defined in the appended claim.

Referring now to Fig. 16, only those elements and connections of the device of Fig. 15 that are necessary to understand the modification have been shown. As in Fig. 15, the signal receiving means includes an acoustic delay line 1601, an input transducer 1602 and an output transducer 1604. The output terminal of transducer 1604 is connected to the input terminal of a demodulator 1617 which has its output terminal connected to the switching circuit through lead 163. The input terminal of transducer 1602 is connected to the output terminal of a modulator 1605 which has its modulation input terminal connected to the output terminal of an "or" gate 1699.

Thus far, the circuit of Fig. 16 is identical with the equivalent circuit shown in Fig. 15. The changes occur in the connections between leads 182, 189, 180 and 231, and the associated input terminals of gate 1699. Thus, lead 182 is connected to one input terminal of gate 1699 through a 22 segment delay circuit 1622, while a 21 segment delay circuit 1621 interconnects lead 189 and another input terminal of gate 1699. Leads 231 and 180 are connected to gate 1699 through a 12 segment delay circuit 1612 and an 11 segment delay circuit 1611, respectively.

In this manner, both "clear" signals from lead 181 and signals from lead 189 are applied to line 1601 with a delay equal to one decade or 21 segments. Where a previous carry was produced in addition, the signal is applied through lead 182 and delay circuit 1622 to modulator 1605, that is, with one segment additional delay. Where the present addition operation produces a carry, the signal is applied through lead 180 and delay circuit 1611, that is, with 10 segment advance with respect to the signals through lead 189. Where both the present and previous addition operations produce a carry, the signal is applied through lead 231 and delay circuit 1612, that is, with 9 segment advance with respect to the signals through lead 189.

It is thus seen that line 1601 and its input and output circuits are the equivalent of the circuit elements of Fig. 15. It should be apparent that other arrangements of the delay circuits may be utilized to accomplish the same result. The general requirement of any combination of delay circuits is that the signals be applied from leads 189, 231, and 180 with 1, 10, and 11 segment advances, respectively, with respect to the signal applied from lead 182. Any combination of delay circuits which satisfies this requirement will operate satisfactorily in the acoustic delay line device of Fig. 15.

What is claimed as new is:

In an electrical decimal calculating machine for performing a mathematical operation of either addition or subtraction upon a pair of numbers, the combination comprising: a rotatable drum having a rim of magnetically retentive material, said rim being divided into a plurality of divisions representing, in the direction of drum rotation, progressively higher decades in the decimal number system, each of said divisions being subdivided into $10+n$ subdivisions, where $n$ is an integer; ten digit writing heads positioned at equally spaced points around the circumference of said rim, the spacing between said heads being equal to the length of one subdivision; a reading-while-erasing head positioned in circumferential alignment with said writing heads and energizable by a signal in any of said subdivisions, said reading-while-erasing head being spaced $x$ times the length of one subdivision from the nearest writing head in the direction of drum rotation, where $x$ is an integer; first, second, third and fouth spaced transfer writing heads positioned in circumferential alignment with and spaced from said digit writing heads and said reading-while-erasing heads in the direction of drum rotation, the spacings between said first, second, third, and fourth transfer heads, respectively, and said reading-while-erasing head being equal to $(x-1)$, $x$, $(x+9)$, and $(x+10)$ times the length of one subdivision; a data installation device for initially applying a signal through said first transfer head to the first subdivision in each of said divisions during one revolution of said drum; a data input device for selectively applying signals to said writing heads, said data input device including a keyboard having ten input terminals and ten output terminals, switch means for connecting said ten output terminals to said digit writing heads, respectively, a signal applying circuit having ten output terminals coupled to the input terminals, respectively, of said keyboard, a control circuit coupled to said signal applying circuit for rendering said signal applying circuit energizable to sequentially apply signals to the input terminals of said keyboard, one sequence for each revolution of said drum, and switch means for selectively actuating said control circuit; a transfer switching device coupled to said transfer heads for selectively applying a signal to one of said transfer heads, said transfer switching device including first, second, third, and fourth signal applying circuits having their output terminals coupled to said first, second, third, and fourth transfer heads, respectively, and a control circuit coupled to said signal applying circuits for sequentially rendering said first, second, third, and fourth signal applying circuits energizable, one sequence for each interval during which a division of said drum passes said reading-while-erasing head; and a signal directing device having an input circuit coupled to said reading-while-erasing head, and a pair of output circuits coupled to said signal applying circuits, respectively, of said data input device and said transfer switching device, said signal directing device being responsive to energization of said reading-while-erasing head for energizing said signal applying circuit of said data input device and said signal applying circuit of said transfer switching device, in sequence, whereby, during revolutions of said drum subsequent to said one revolution, each of said signal applying circuits is energized once during the interval that each division of said drum passes said reading-while-erasing head.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,587,532 | Schmidt | Feb. 26, 1952 |
| 2,609,143 | Stibitz | Sept. 2, 1952 |
| 2,609,439 | Marshall | Sept. 2, 1952 |
| 2,614,169 | Cohen | Oct. 14, 1952 |
| 2,701,095 | Stibitz | Feb. 1, 1955 |
| 2,739,299 | Burkhart | Mar. 20, 1956 |

OTHER REFERENCES

"A Functional Description of the EDVAC," Moore School of Engineering, Univ. of Pennsylvania, November 1949, vol. I, pages 4–19 to 4–29, vol. II, Fig. 104–3LD-2.

Investigations for Design of Digital Calculating Machinery, Progress Report #2, Harvard University, Cambridge, Mass. Distributed Nov. 10, 1948, pages II–5 to II–21.

Proceedings of the IRE, May 1950, "A Dynamically Regenerated Electrostatic Memory System," by Eckert et al., pages 498–510.

Proceedings of the Institute of Electrical Engineers, Part II, volume 98, No. 61; pages 13–34, February 1951.

Proceedings of the IRE, August 1949, "Mercury Delay Line Memory Using a Pulse Date of Several Megacycles," by Auerbach et al., pages 855–861.